United States Patent
Morinaga et al.

(10) Patent No.: US 8,503,301 B2
(45) Date of Patent: Aug. 6, 2013

(54) RELAY DEVICE, STATE INFORMING METHOD, AND COMPUTER PROGRAM

(75) Inventors: Masanobu Morinaga, Kawasaki (JP);
Noriyuki Fukuyama, Kawasaki (JP);
Hideaki Miyazaki, Kawasaki (JP);
Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 12/732,368

(22) Filed: Mar. 26, 2010

(65) Prior Publication Data
US 2010/0246583 A1  Sep. 30, 2010

(30) Foreign Application Priority Data

Mar. 30, 2009 (JP) .................... 2009-081000
Oct. 28, 2009 (JP) .................... 2009-247354

(51) Int. Cl.
*H04L 1/00* (2006.01)
*H04L 12/26* (2006.01)

(52) U.S. Cl.
USPC .......... 370/235; 370/218; 370/221; 370/225; 370/230; 370/252

(58) Field of Classification Search
USPC ............. 370/217, 218, 221, 225, 229, 230, 370/235, 252
See application file for complete search history.

(56) References Cited

U.S. PATENT DOCUMENTS

| | | | | |
|---|---|---|---|---|
| 7,911,960 B1 * | 3/2011 | Aydemir et al. | ............... | 370/236 |
| 2002/0085489 A1 * | 7/2002 | Sartain et al. | .................. | 370/229 |
| 2002/0118641 A1 | 8/2002 | Kobayashi | | |
| 2005/0243722 A1 * | 11/2005 | Liu et al. | ........................ | 370/235 |
| 2008/0212472 A1 * | 9/2008 | Musacchio et al. | ............ | 370/232 |
| 2009/0086636 A1 * | 4/2009 | Chow et al. | .................... | 370/236 |
| 2010/0188971 A1 * | 7/2010 | Chiang | ......................... | 370/225 |

FOREIGN PATENT DOCUMENTS

| | | |
|---|---|---|
| JP | 8-251226 | 9/1996 |
| JP | 11-68817 | 3/1999 |
| JP | 2000-151607 | 5/2000 |
| JP | 2002-252640 | 9/2002 |
| JP | 2004-214940 | 7/2004 |
| JP | 2004-274289 | 9/2004 |
| JP | 2007-68093 | 3/2007 |

OTHER PUBLICATIONS

Japanese Office Action mailed May 21, 2013 for corresponding Japanese Application No. 2009-247354.

* cited by examiner

*Primary Examiner* — Ronald Abelson
(74) *Attorney, Agent, or Firm* — Staas & Halsey LLP

(57) ABSTRACT

A relay device which forwards a packet received from a first device to a second device, the relay device includes a detection unit that detects that the relay device has been in a specified state, a generation unit that generates a packet that contains information for identifying the relay device and information indicating that the relay device is in the specified state when the detection unit detects that the relay device has been in the specified state, and a transmission unit that transmits the generated packet to a specific transmission destination.

16 Claims, 20 Drawing Sheets

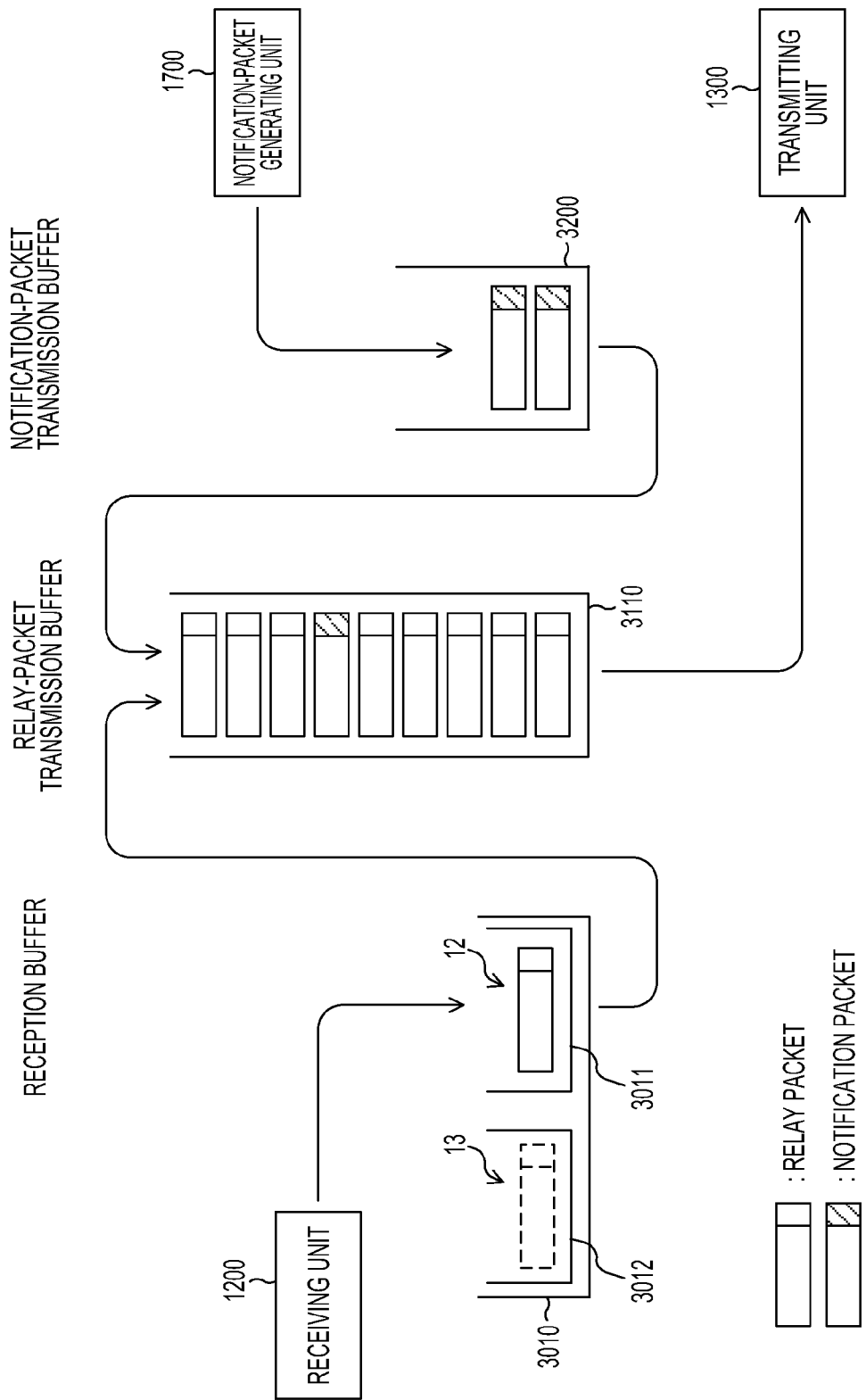

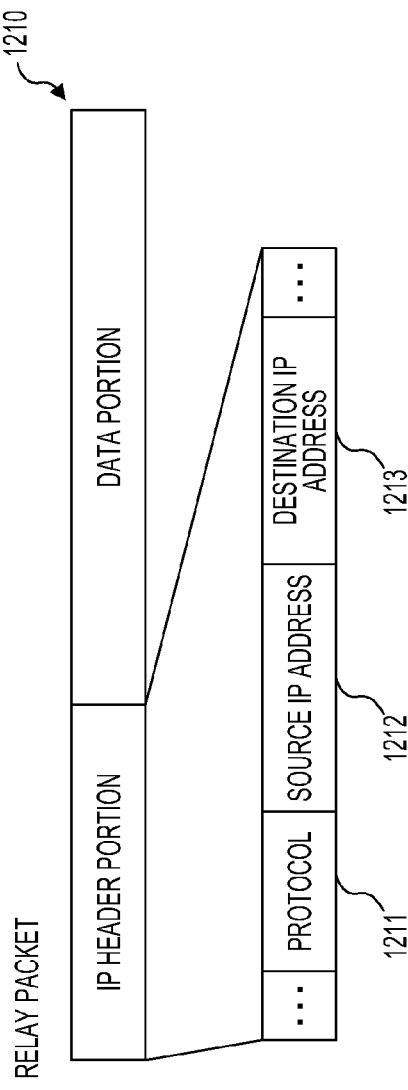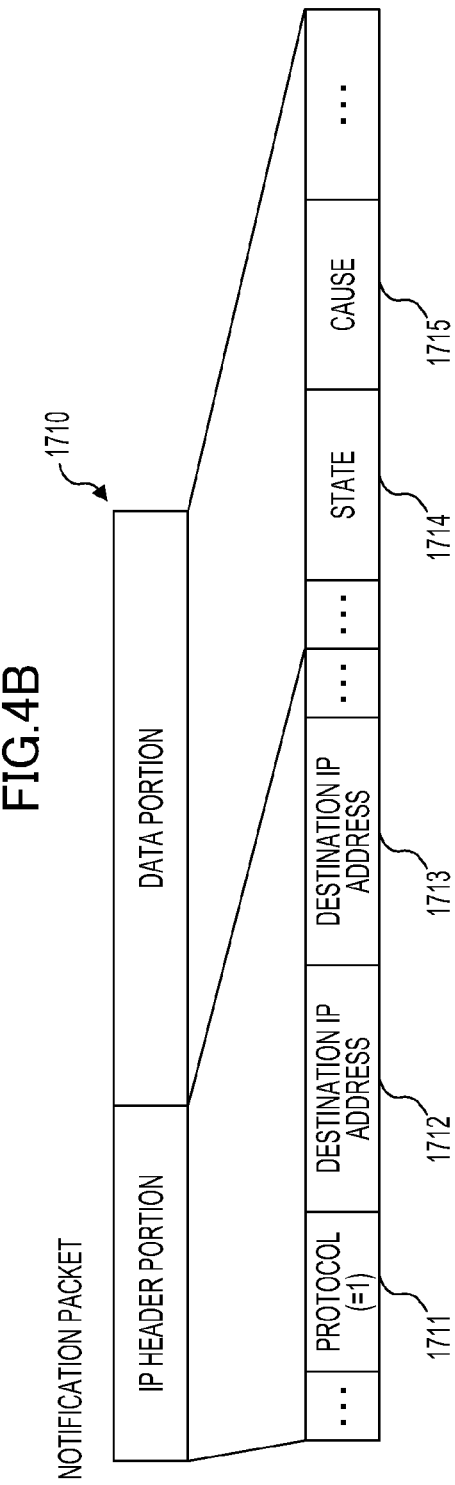

| DESTINATION | NEXT LOCATION | PORT |
|---|---|---|
| ... | ... | ... |
| IPaddr-A | R3 | 2 |
| IPaddr-B | R5 | 1 |
| IPaddr-C | R3 | 2 |
| IPaddr-D | R3 | 1 |
| ... | ... | ... |
| IPaddr-K | DIRECT | 3 |
| IPaddr-L | DIRECT | 4 |
| IPaddr-M | DIRECT | 5 |
| ... | ... | ... |

RELAY DEVICE, STATE INFORMING METHOD, AND COMPUTER PROGRAM

CROSS-REFERENCE TO RELATED APPLICATIONS

This application is based upon and claims the benefit of priority of the prior Japanese Patent Application No. 2009-081000, filed on Mar. 30, 2009, and the prior Japanese Patent Application No. 2009-247354, filed on Oct. 28, 2009, the entire contents of which are incorporated herein by reference.

FIELD

The embodiments relate to a relay device that forwards a packet.

BACKGROUND

With the advancement of information processing technologies in recent years, a packet switching network has become used in not only simple data transmission, such as sending and receiving e-mail, but also real-time communications, such as audio and video communications, for example, IP telephony and IP broadcasting.

For such real-time communications, monitoring and managing communication quality is especially important. This is because, for example, in the case of IP telephone, voice, which is carried in packets, may not be correctly carried if a packet delay or a packet loss occurs.

Traditionally used methods of monitoring communication quality may be classified into active and passive ones.

The active communication quality monitoring method is the one of actually measuring network performance by, for example, transmitting a test packet to a packet switching network and measuring its response time. For this method, it is necessary to send out many test packets to the packet switching network. With this method, it is impossible to identify the position of an abnormal event that occurred only once by transmitting a test packet after the occurrence of the abnormal event.

The passive communication quality monitoring method is the one of analyzing network quality by capturing a packet being transmitted in a packet switching network using a measurement device. With this method, although the position of a trouble may be roughly identified in accordance with the position of the measurement device, it is very difficult to precisely identify it.

A technique is proposed that collects, by a management manager, information regarding quality from monitoring agents arranged at a plurality of positions on a network and determining a zone at which the quality is degraded from the collected information (see Japanese Laid-open Patent Publication No. 2007-68093). With this technique, a zone at which the quality is degraded may be found.

SUMMARY

A relay device which forwards a packet received from a first device to a second device, the relay device includes a detection unit that detects that the relay device has been in a specified state, a generation unit that generates a packet that contains information for identifying the relay device and information indicating that the relay device is in the specified state when the detection unit detects that the relay device has been in the specified state, and a transmission unit that transmits the generated packet to a specific transmission destination.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 3 illustrates an example of usage of buffers;
FIG. 4A illustrates an example of a configuration and content of a relay packet;
FIG. 4B illustrates an example of a configuration and content of a notification packet.

DESCRIPTION OF EMBODIMENTS

First Embodiment

In a network according to a first embodiment, a relay device in which a fault, such as a packet loss, occurs itself generates a packet that contains information indicating the details of the fault and transmits it on the network.

That is, because a relay device in which a fault occurs itself generates and transmits a packet, other apparatus on a network may be notified of the accurate location of the occurrence of the fault and the details thereof.

Additionally, the transmission destination of a generated packet may be set variously for various receivers to which the information is wanted to be conveyed. That is, the position and cause of the occurrence of a fault may be efficiently and accurately notified to an apparatus that needs to find it.

Accordingly, an apparatus receiving a packet containing information that indicates the location of the occurrence of a fault and the details thereof (hereinafter referred to as a "notification packet") may promptly and accurately take measures in accordance with the location of the occurrence of the fault and the details thereof.

A relay device according to the first embodiment is described with reference to the drawings. In the first embodiment, a router is described as an example of the above relay device. A case where a buffer overflow occurs is described as an example of the occurrence of a fault. A packet that is received by a router from another apparatus and then forwarded is called "relay packet."

<Function>

Figure 1:
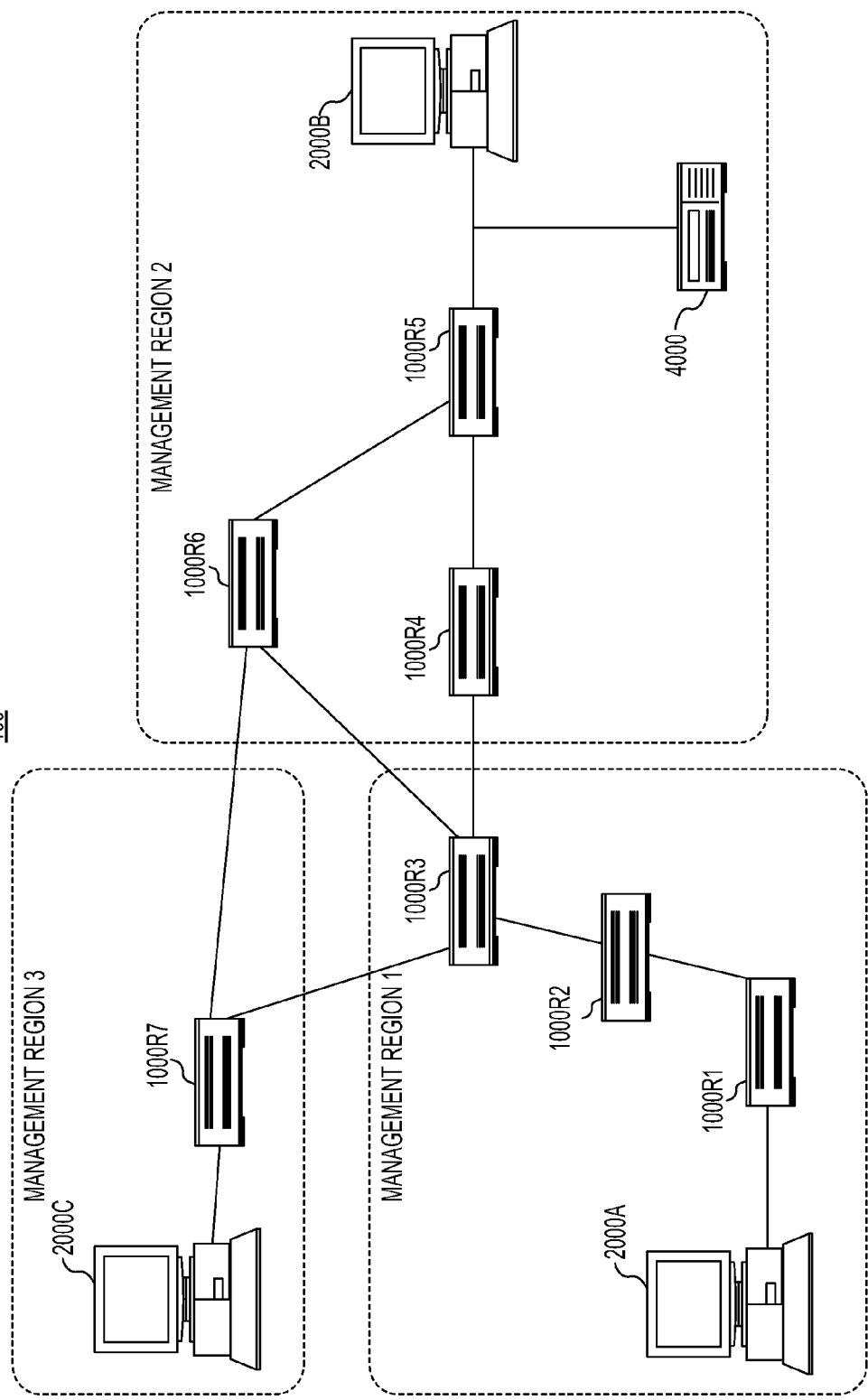
FIG. 1 illustrates an example of a network configuration.

FIG. 1 illustrates an example of a configuration of a network including a router according to the first embodiment.

A network 100 includes end terminals 2000A to 2000C, routers 1000R1 to 1000R7, and a probe device 4000.

The network 100 includes management regions 1 to 3 of three different communications carriers. A router according to the first embodiment may set any destination of a notification packet to be transmitted, so it may notify information even to other management regions.

The end terminal 2000A is a terminal of a personal computer (PC), an IP telephone, or other devices. Each of the end terminals 2000B and 2000C is also a terminal of a PC, an IP telephone, or other devices, as in the case of the end terminal 2000A.

The router 1000R1 is an apparatus that relays data received from a device to another device, and refers to the destination of the data and determines a route through which the data is to be forwarded. Each of the routers 1000R2 to 1000R7 has substantially the same functions as the router 1000R1. The routers 1000R1 to 1000R7 are collectively called "router 1000."

The probe device 4000 captures a packet being transmitted on a network and monitors the state of the network.

In the following description, the end terminal 2000A is referred to as the end terminal A, and the same applies to the end terminal 2000B and the other end terminals. The router 1000R1 is referred to as the router R1, and the same applies to the router 1000R2 and the other routers.

In the first embodiment, a case where a packet is transmitted to an end terminal to another end terminal in the network 100 is described as an example.

Next, the router 1000 is described with reference to FIG. 2.

Figure 2:
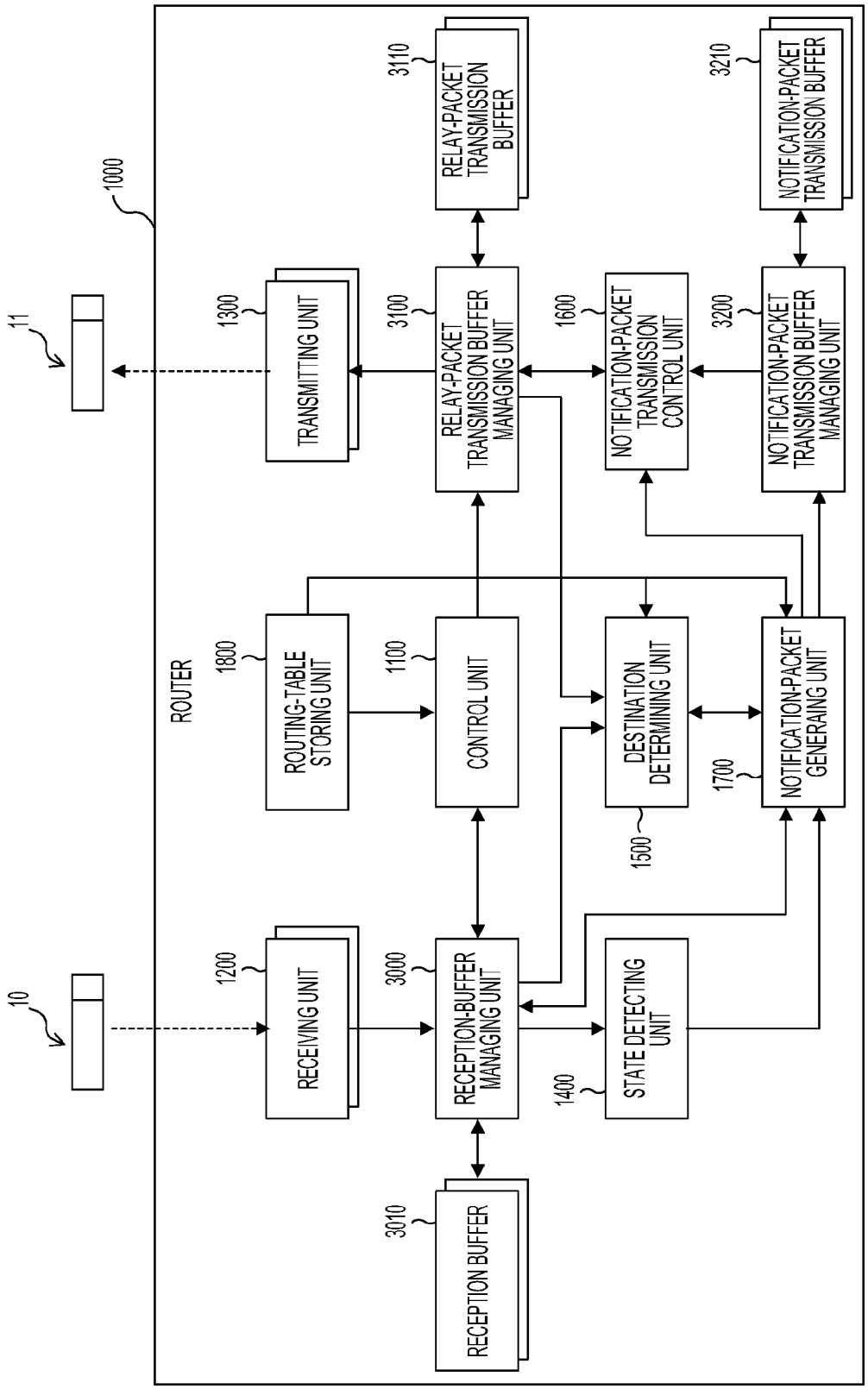
FIG. 2 illustrates an example of a functional configuration of a router.

FIG. 2 illustrates an example of a functional configuration of the router 1000. Each of the routers R1 to R7 included in the network 100 (see FIG. 1) has substantially the same configuration as the router 1000.

The router 1000 includes a control unit 1100, receiving units 1200, transmitting units 1300, a state detecting unit 1400, a destination determining unit 1500, a notification-packet transmission control unit 1600, a notification-packet generating unit 1700, a routing-table storing unit 1800, a reception-buffer managing unit 3000, reception buffers 3010, a relay-packet transmission buffer managing unit 3100, relay-packet transmission buffers 3110, a notification-packet transmission buffer managing unit 3200, and notification-packet transmission buffers 3210.

In FIG. 2, a portion illustrated using two overlapping rectangles consists of a plurality of substantially the same function units. That is, the plurality of receiving units 1200, transmitting units 1300, and buffers (3010, 3110, and 3210) exist.

The control unit 1100 performs processing relating to routing required for the router 1000 and other control processing and also executes control for processing characteristic of the embodiments.

Each of the receiving units 1200 has a single reception port being a reception interface. The receiving unit 1200 receives a packet 10 through the reception port. The receiving unit 1200 stores the received packet in the corresponding reception buffer 3010 through the reception-buffer managing unit 3000.

Each of the transmitting units 1300 has a single transmission port being a transmission interface. The transmitting unit 1300 transmits a packet 11 through the transmission port. The packet to be transmitted is read from the corresponding relay-packet transmission buffer 3110 through the relay-packet transmission buffer managing unit 3100.

The router 1000 has a plurality of ports. Each port may be used as a reception port and also be used as a transmission port. The reception port allows a packet to be received therethrough. The transmission port allows a packet to be transmitted therethrough.

That is, the router 1000 has the receiving units 1200 corresponding to the reception ports and the reception buffers 3010 for storing packets received through their respective reception ports. The reception buffers 3010 correspond to the reception ports. Similarly, the router 1000 has the transmitting units 1300 corresponding to the transmission ports and the relay-packet transmission buffers 3110 and the notification-packet transmission buffers 3210 for storing packets to be transmitted through their respective transmission ports. The relay-packet transmission buffers 3110 and the notification-packet transmission buffers 3210 correspond to the transmission ports.

The state detecting unit 1400 determines whether a notification packet is to be transmitted by detecting the state of the router 1000. In the first embodiment, the reception-buffer managing unit 3000 notifies the state detecting unit 1400 of the state of the reception buffer 3010 as the state of the router 1000. When detecting the occurrence of a buffer overflow from the provided state of the reception buffer 3010, the state detecting unit 1400 determines that a notification packet is to be transmitted. Note that the state detecting unit 1400 stores in advance a case where a notification packet is to be transmitted.

The destination determining unit 1500 determines an IP address of a destination of a notification packet generated by the router 1000. Which device a notification packet is to be transmitted to, that is, which device a notification packet is to be transmitted to, a device being the transmission source of a lost packet, a device being the transmission destination thereof, or a causal terminal device, is set in advance. For example, the destination of a lost packet may be set to the destination of a notification packet. The destination determining unit 1500 determines a detailed IP address of the destination.

The notification-packet transmission control unit 1600 controls the timing of transmitting a notification packet. Specifically, the notification-packet transmission control unit

1600 moves a notification packet stored in the notification-packet transmission buffer 3210 to the relay-packet transmission buffer 3110.

In detail, the notification-packet transmission control unit 1600 moves a notification packet while measuring the timing of movement for each transmission port. When determining the timing of movement, the notification-packet transmission control unit 1600 extracts a notification packet from the notification-packet transmission buffer 3210 through the notification-packet transmission buffer managing unit 3200 and stores the extracted notification packet in the relay-packet transmission buffer 3110 through the relay-packet transmission buffer managing unit 3100. The timing of movement is described below with reference to FIG. 6.

In response to a request from the state detecting unit 1400, the notification-packet generating unit 1700 generates a notification packet. Specifically, it generates a notification packet that contains code indicating a buffer overflow. The notification-packet generating unit 1700 acquires the destination of the notification packet by requesting it from the destination determining unit 1500.

The routing-table storing unit 1800 stores a table for being referred to in order to allow determination of which route is used in forwarding a received packet therethrough.

The reception-buffer managing unit 3000 stores a packet received by the receiving unit 1200 from a reception port in the reception buffer 3010 corresponding to the reception port through which the packet was received. The packet is stored in a first-in first-out (FIFO) manner.

The reception-buffer managing unit 3000 detects the occurrence of a buffer overflow and then notifies the state detecting unit 1400. How the occurrence of a buffer overflow is detected is described in the section <Buffer>.

The reception-buffer managing unit 3000 answers an inquiry about a packet stored in the reception buffer 3010 from the notification-packet generating unit 1700. The reception buffer 3010 stores a packet.

The reception buffer 3010 has two buffer areas: a basic buffer area 3011 and an overflow determination buffer area 3012 (see FIG. 3). These two buffer areas are described in detail in the section <Buffer>.

As previously described, the number of reception buffers 3010 corresponds to the number of reception ports, and the reception buffers 3010 are associated with their respective reception ports.

The relay-packet transmission buffer managing unit 3100 stores a packet to be transmitted by the transmitting unit 1300 in the relay-packet transmission buffer 3110 for each transmission port in a FIFO manner. A packet to be stored is passed from the control unit 1100 in a state where a transmission port is specified.

In response to an instruction to transmit a packet with a transmission port being specified from the control unit 1100, the relay-packet transmission buffer managing unit 3100 reads the packet from the relay-packet transmission buffer 3110 corresponding to the specified transmission port and passes it to the transmitting unit 1300 corresponding to the specified transmission port. In addition, the relay-packet transmission buffer managing unit 3100 answers an inquiry about a packet stored in the relay-packet transmission buffer 3110 from the destination determining unit 1500.

The relay-packet transmission buffer 3110 stores a relay packet. As previously described, the number of relay-packet transmission buffers 3110 corresponds to the number of transmission ports, and the relay-packet transmission buffers 3110 are associated with their respective transmission ports.

The notification-packet transmission buffer managing unit 3200 stores a notification packet in the notification-packet transmission buffer 3210 for each transmission port in a FIFO manner.

In response to an instruction in which the transmission port is specified from the notification-packet transmission control unit 1600, the notification-packet transmission buffer managing unit 3200 extracts a notification packet stored in the notification-packet transmission buffer 3210 corresponding to the specified transmission port and passes it. In addition, the notification-packet transmission buffer managing unit 3200 answers an inquiry about a packet stored in the notification-packet transmission buffer 3210 from the notification-packet transmission control unit 1600.

The notification-packet transmission buffer 3210 stores a notification packet. As previously described, the number of notification-packet transmission buffers 3210 corresponds to the number of transmission ports, and the notification-packet transmission buffers 3210 are associated with their respective transmission ports.

All or part of the above-described functions is achieved by execution of a program recorded in, for example, memory, by a central processing unit (CPU) included in the router 1000.

<Buffer>

How buffers are used is described below with reference to FIG. 3. FIG. 3 illustrates an example of usage of buffers.

In FIG. 3, a relay packet is a packet transmitted from an end terminal and then relayed by the router 1000. A notification packet is a packet generated by the router 1000 and then sent out (the same applies to in FIGS. 7 to 10 and 14).

First, a relay packet received by the receiving unit 1200 is temporarily stored in the reception buffer 3010 through the reception-buffer managing unit 3000. The reception buffer 3010 has two buffer areas of the basic buffer area 3011 and the overflow determination buffer area 3012, as described above. Each of the basic buffer area 3011 and the overflow determination buffer area 3012 includes a capacity that allows a single relay packet to be stored.

The basic buffer area 3011 typically has a capacity that allows a plurality of relay packets to be stored. However, in the first embodiment, for the sake of convenience of the description, the basic buffer area 3011 is assumed to have a capacity that allows a single relay packet to be stored.

When a process for forwarding a relay packet is normally performed, a packet received through a reception port is stored in the basic buffer area 3011 by the reception-buffer managing unit 3000. Immediately thereafter, the packet is moved to the relay-packet transmission buffer 3110 corresponding to a transmission port being the sending destination determined by the control unit 1100.

However, before a packet is moved from the basic buffer area 3011 to the relay-packet transmission buffer 3110, that is, when a relay packet 12 still exists in the basic buffer area 3011, a next relay packet 13 may be received through the reception port.

In this case, the reception-buffer managing unit 3000 stores the received relay packet 13 in the overflow determination buffer area 3012. In the first embodiment, when the relay packet 13 is stored in the overflow determination buffer area 3012, a buffer overflow is assumed to occur. That is, the reception-buffer managing unit 3000 detects the occurrence of a buffer overflow when the relay packet 13 is stored in the overflow determination buffer area 3012.

The relay packet 12 stored in the basic buffer area 3011 is considered to be buffered, and it is thus subjected to a normal forwarding process. In contrast, the relay packet 13 stored in the overflow determination buffer area 3012 is assumed as a lost packet, and thus it is not subjected to a forwarding process.

If relay packets still exist in both the basic buffer area 3011 and the overflow determination buffer area 3012 when a received relay packet is attempted to be stored, the received relay packet is deleted. This enables identifying the relay packet 13 being the first at which loss begins. The relay packet 13 determined to be a lost packet is deleted from the overflow determination buffer area 3012 when it is referred to in order to generate a notification packet.

Then, relay and notification packets stored in the relay-packet transmission buffer 3110 are sequentially read in order from a packet that was stored first and sent out through a transmission port by the transmitting unit 1300. The timing of passing a packet to the transmitting unit 1300 is determined by the control unit 1100 in consideration of, for example, the bandwidth of the transmission port.

Accordingly, when the speed at which the receiving unit 1200 receives a packet is higher than the speed at which the transmitting unit 1300 transmits a packet through a transmission port, a buffer overflow occurs.

In the first embodiment, when a relay packet is stored in the overflow determination buffer area 3012, a buffer overflow is determined to occur. The buffer overflow is notified to the state detecting unit 1400 by the reception-buffer managing unit 3000. The state detecting unit 1400 determines whether the notification packet is to be transmitted.

Next, the notification-packet transmission buffer 3210 is described.

The notification-packet transmission buffer 3210 stores a notification packet generated by the notification-packet generating unit 1700.

In the case of a buffer overflow, the relay-packet transmission buffer 3110 typically has no vacancy, so a generated notification packet is stored in the notification-packet transmission buffer 3210, which is different from the relay-packet transmission buffer 3110.

Notification packets stored in the notification-packet transmission buffer 3210 are sequentially moved to the relay-packet transmission buffer 3110 in order from a packet that was stored first. The timing of movement is the one at which a vacancy of the relay-packet transmission buffer 3110 is found by the notification-packet transmission control unit 1600.

The notification packets moved to the relay-packet transmission buffer 3110 are sequentially sent out from a transmission port by the transmitting unit 1300 in order from a packet that was stored first.

<Packet>

Packets used in the network 100 of the first embodiment are described below with reference to FIGS. 4A and 4B.

FIG. 4A illustrates an example of a configuration and content of a relay packet. FIG. 4B illustrates an example of a configuration and content of a notification packet.

A relay packet 1210 illustrated in FIG. 4A is an IP packet and has an IP header portion and a data portion.

The IP header portion includes a protocol 1211, a source IP address 1212, and a destination IP address 1213.

The protocol 1211 indicates a higher protocol to which the data portion is to be transmitted.

The source IP address 1212 is an IP address from which the relay packet 1210 is transmitted. The destination IP address 1213 is an IP address of a receiver to which the relay packet 1210 is to be transmitted.

For example, when the relay packet 1210 is transmitted from the end terminal A to the end terminal B, the IP address of the end terminal A is set to the source IP address 1212, and the IP address of the end terminal B is set to the destination IP address 1213.

The data portion is the one in which data being the target to be carried in the relay packet 1210, that is, a payload is placed.

A notification packet 1710 illustrated in FIG. 4B is an Internet control message protocol (ICMP) packet. In the first embodiment, notification of the occurrence of a buffer overflow is provided by ICMP.

The notification packet 1710 is composed of an IP header portion and a data portion.

The IP header portion includes a protocol 1711, a source IP address 1712, and a destination IP address 1713.

In the protocol 1711, "1" indicating that the packet is based on ICMP is set.

In the source IP address 1712, the IP address of a router that is to transmit the notification packet 1710 is set. That is, the IP address of a router in which a buffer overflow occurs is set.

In the destination IP address 1713, the IP address of a destination determined by the destination determining unit 1500 is set.

The data portion includes data representing a content to be informed. Specifically, it includes a state 1714 and a cause 1715.

The state 1714 indicates a state of the occurrence of an event. For example, code indicating "packet loss" is set.

The cause 1715 indicates a cause of the state represented by the state 1714. For example, code indicating "buffer overflow" is set.

<Data>

Next, main data elements used in the network 100 in the first embodiment are described with reference to FIG. 5.

Figure 5:
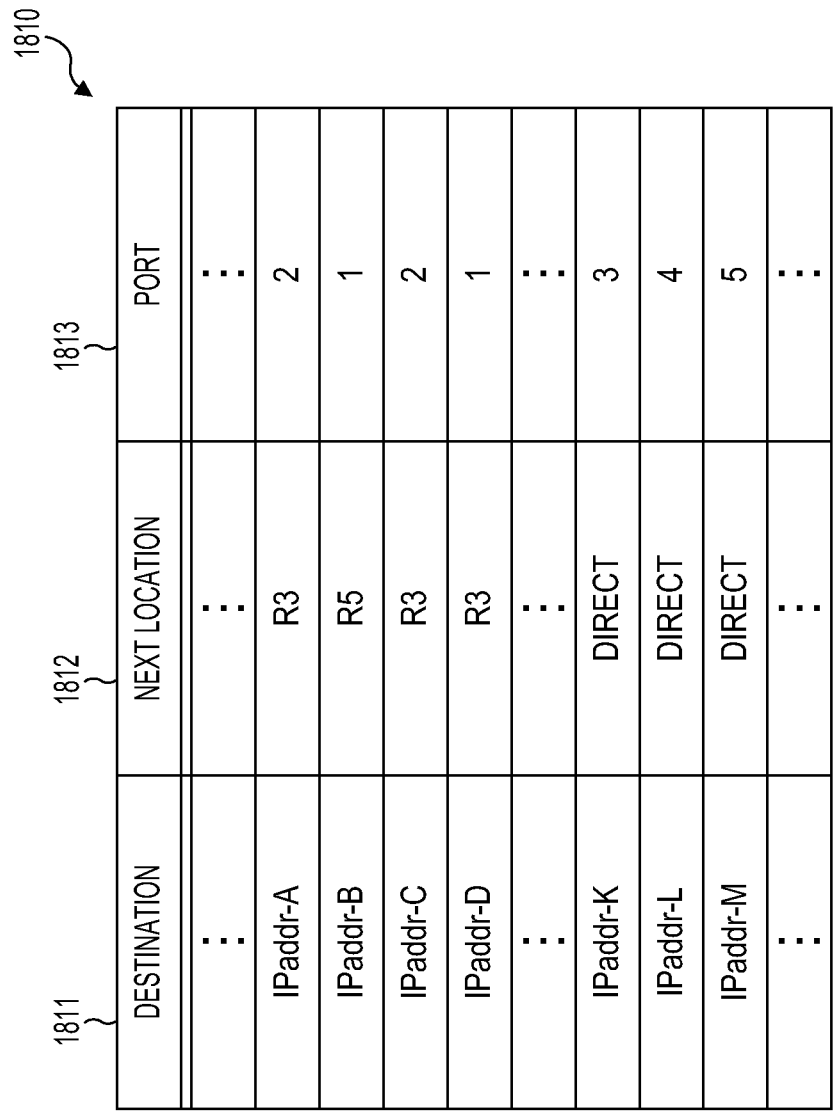
FIG. 5 illustrates an example of a configuration and content of a routing table.

FIG. 5 illustrates an example of a configuration and content of a routing table 1810 stored in the routing-table storing unit 1800.

The routing table 1810 includes a destination 1811, a next location 1812, and a port 1813.

The destination 1811 indicates the IP address of a destination of a packet to be forwarded. For example, it indicates the IP address of an end terminal.

The next location 1812 indicates the IP address of a next router to which a packet is to be sent. Here, for the sake of convenience, the IP address of the router R3 is described as "R3," and the same applied to other routers. In this column, "direct" indicates that the next location is connected directly to the router 1000 itself.

The port 1813 is the identifier of a port through which a packet is to be sent out.

<Operation>

Next, operation of the router 1000 is described with reference to FIGS. 6 to 10.

Figure 6:
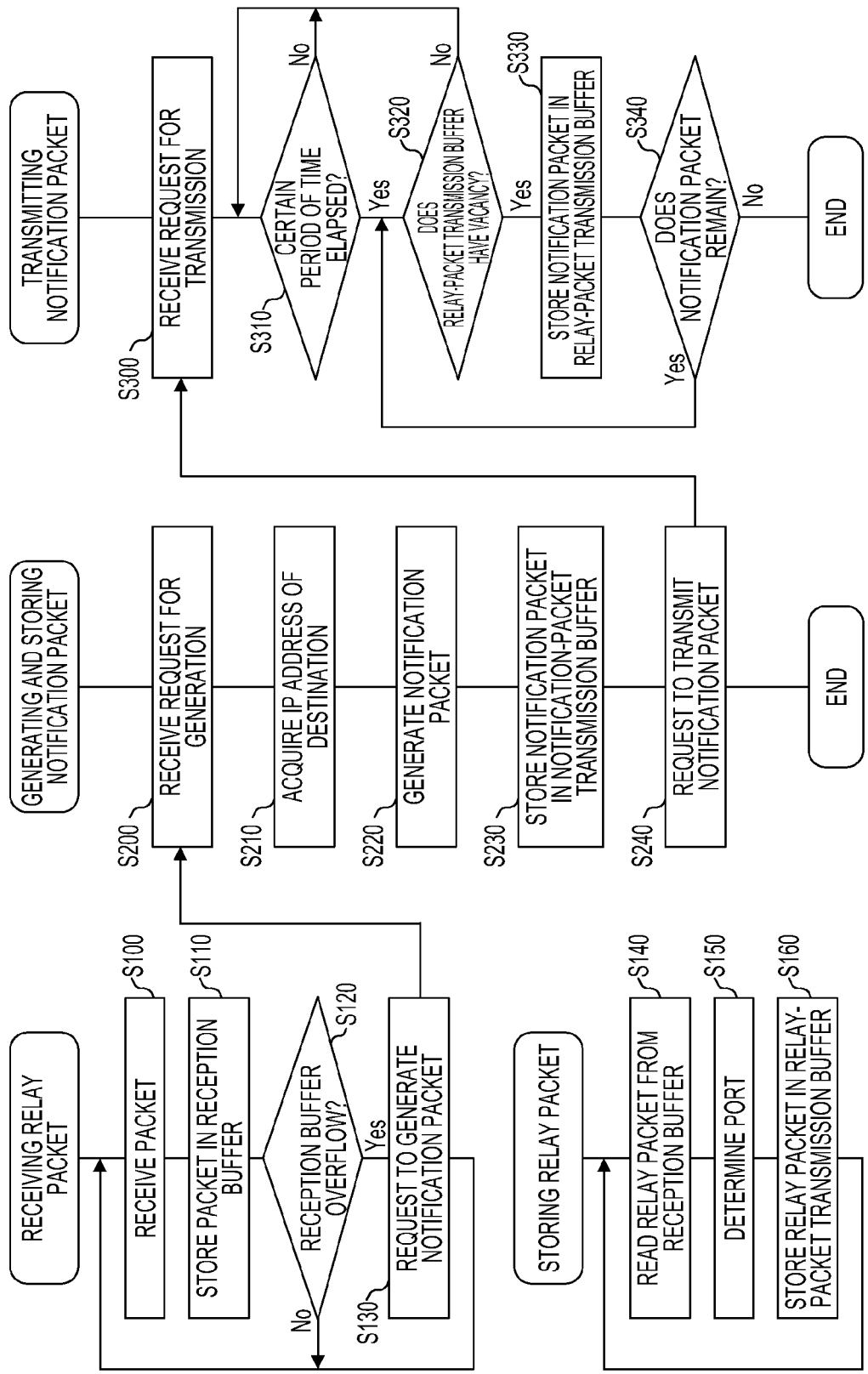
FIG. 6 illustrates processing performed by a router when a buffer overflow occurs.

FIG. 6 illustrates processing performed by the router 1000 when a buffer overflow occurs.

FIGS. 7 to 10 illustrate processing performed by a router in cases where notification packets are transmitted to different transmission destinations when a buffer overflow occurs in the network 100. In FIGS. 7 to 10, a packet is transmitted from the end terminal A to the end terminal B, and a buffer overflow occurs in the hatched router R4.

In FIGS. 7 to 10, for a relay packet 15 transmitted from the end terminal A toward the end terminal B, the IP address of the end terminal A is set to the source IP address 1212, and the IP address of the end terminal B is set to the destination IP address 1213 (see FIG. 4A).

The character in a rectangle of a relay packet indicates the destination of the packet. The same applies to a notification packet.

After being sent out from the end terminal A, the relay packet 15 is forwarded to the router R1 to router R2 to router R3 to router R4 to router R5 in sequence, and it reaches the end terminal B. Note that relay packets are sequentially transmitted from the end terminal A.

In the first embodiment, four transmission destinations of a notification packet are described in four cases.

The first case is that the destination of a packet lost by a buffer overflow is set to the transmission destination of a notification packet. This case is described with reference to FIG. 7.

The second case is that the transmission source of a packet lost by a buffer overflow is set to the transmission destination of a notification packet. This case is described with reference to FIG. 8.

The third case is that an end terminal directly causing a buffer overflow is set to the transmission destination of a notification packet. This case is described with reference to FIG. 9.

The fourth case is that devices adjacent to a router in which a buffer overflow occurs are set to the transmission destination of a notification packet. This case is described with reference to FIG. 10.

In the first embodiment, which destination a notification packet is to be transmitted to is set in advance in the destination determining unit 1500, and a detailed IP address is determined by the destination determining unit 1500 referring to a packet.

<Case 1: Transmit to Destination of Lost Packet>

Figure 7:
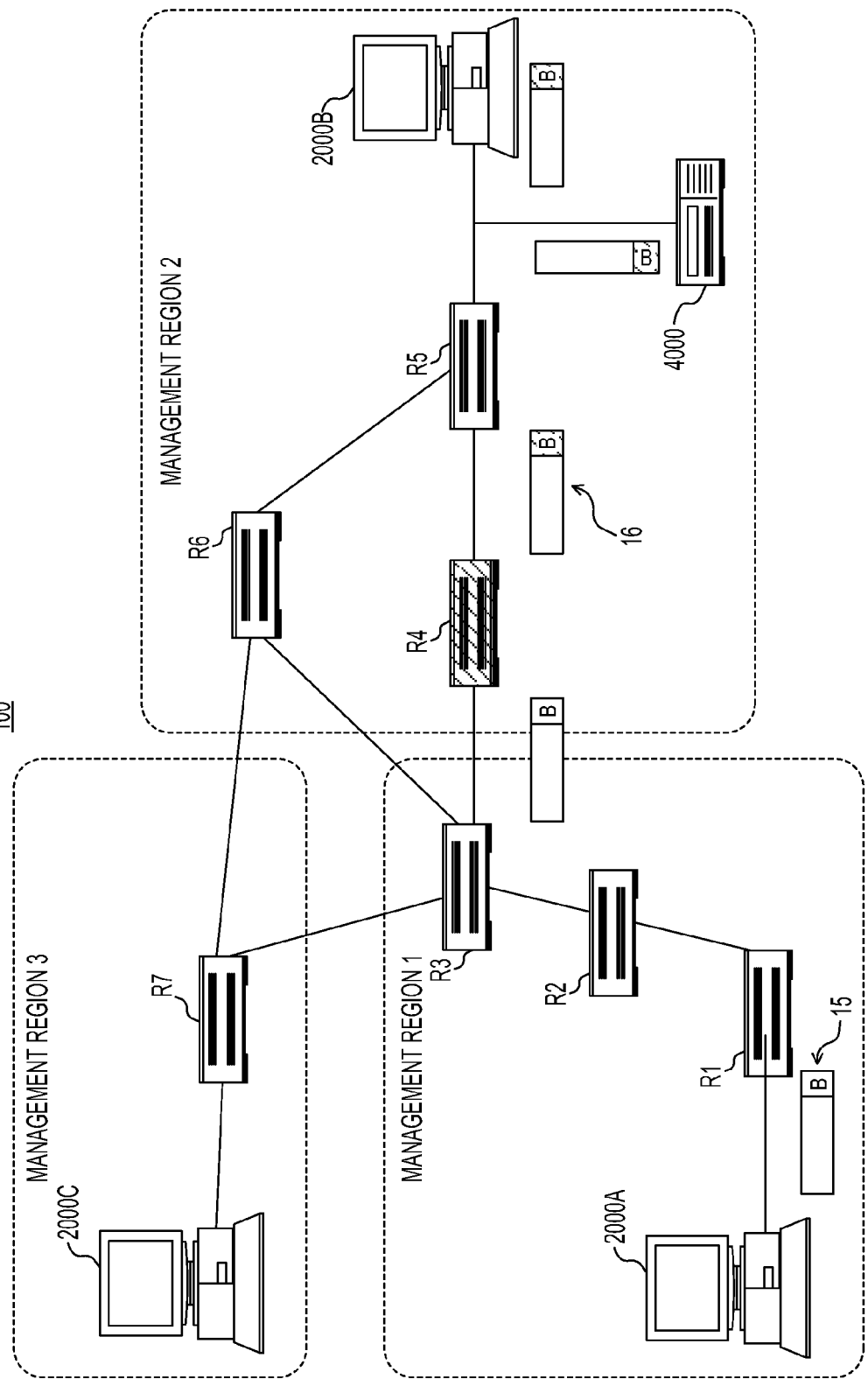
FIG. 7 illustrates processing performed by a router in a case where a notification packet is transmitted toward a transmission destination of a lost relay packet.

FIG. 7 illustrates processing performed by a router in a case where a notification packet is transmitted toward the transmission destination of a relay packet lost by a buffer overflow.

The router R4 in which a relay packet whose destination is the end terminal B is lost sends out a notification packet 16 toward the end terminal B.

Transmitting a notification packet to the transmission destination of a lost relay packet enables a device on its route, for example, the probe device 4000 to accurately identify a state of a packet loss, its cause, and the position of its occurrence. For example, a state of a packet loss which is caused by a buffer overflow which occurs in the router R4 may be identified. Accurately identifying the cause and position of the occurrence enables the probe device 4000 or other devices to promptly take appropriate measures.

A router on the route through which a notification packet is transmitted also may accurately identify a state of a packet loss, its cause, and the position of the occurrence by referring to data of the notification packet when the router forwards the notification packet. Accordingly, a router that finds the occurrence of a fault in another router on the communication route may promptly take appropriate measures, such as changing a location to which a packet is to be sent, in accordance with the fault and the position of the router.

It is noted that a probe device and a router on the route may promptly take appropriate measures also when a notification packet is transmitted to a destination other than the transmission destination of a lost relay packet.

An end terminal being the transmission destination of a lost packet also may accurately identify the cause of a state of a packet loss and the position of the occurrence, so the end terminal also may promptly take appropriate measures. For example, the end terminal B may find the occurrence of the fault in a router on the communication route, not in the end terminal A. Accordingly, when the end terminals A and B carry out interactive communication, the end terminal B may perform good communication by changing the communication route to the end terminal A.

Processes performed by the router 1000 when the destination of a packet lost by a buffer overflow is set to the transmission destination of a notification packet are described below with reference to the flowcharts of FIG. 6.

The processes performed by the router 1000 when a buffer overflow occurs are described in three parts: a process of receiving and storing a relay packet; a process of generating and storing a notification packet; a process of transmitting a notification packet.

<Process of Receiving and Storing Relay Packet>

The process of receiving a relay packet and storing a relay packet is described below.

Receiving a relay packet and storing a relay packet are simultaneously performed, so they are described in two flowcharts.

First, receiving a relay packet is described.

The receiving unit 1200 of the router R4 receives the relay packet 1210 (step S100).

After receiving the relay packet, the receiving unit 1200 requests the reception-buffer managing unit 3000 to store it. In this request, the receiving unit 1200 passes the received relay packet 1210 with the reception port being specified. The reception port is specified by passing the identifier of the reception port through which the relay packet 1210 was received.

In response to the request, the reception-buffer managing unit 3000 stores the passed relay packet 1210 in the basic buffer area 3011 of the reception buffer 3010 corresponding to the specified reception port (step S110).

If the basic buffer area 3011 has no vacancy and the passed relay packet 1210 is thus stored in the overflow determination buffer area 3012, the reception-buffer managing unit 3000 assumes that a buffer overflow occurs and notifies the state detecting unit 1400 of the identifier of the reception port and the occurrence.

In response to the notification, the state detecting unit 1400 determines that a buffer overflow occurs (Yes in step S120) and requests the notification-packet generating unit 1700 to generate a notification packet (step S130). At this time, the reception port is specified.

After that, flow returns to step S100, and steps S100 to S130 are repeated.

If no overflow occurs in the reception buffer 3010 (No is step S120), flow returns to step S100, and steps S100 to S130 are repeated.

Next, storing a relay packet is described.

In response to the request to pass the relay packet from the control unit 1100, the reception-buffer managing unit 3000 reads the relay packet 1210 from the basic buffer area 3011 of the reception buffer 3010 and passes it to the control unit 1100 (step S140).

The control unit 1100 researches the destination 1811 of the routing table 1810 stored in the routing-table storing unit 1800. The control unit 1100 determines the transmission port indicated by the port 1813 of a record that has the same IP address in the destination 1811 as the destination IP address 1213 of the passed relay packet 1210 as the transmission port through which the relay packet is to be sent out (step S150).

The control unit 1100 passes the relay packet 1210, which may be corrected if necessary, to the relay-packet transmission buffer managing unit 3100 and requests the relay-packet transmission buffer managing unit 3100 to store the relay packet 1210 in the relay-packet transmission buffer 3110 for the determined transmission port.

In response to the request, the relay-packet transmission buffer managing unit 3100 stores the received relay packet 1210 in the relay-packet transmission buffer 3110 of the requested transmission port (step S160).

In response to an instruction from the control unit 1100, the relay-packet transmission buffer managing unit 3100 reads the packet from the transmission port indicated by the instruction and passes it to the transmitting unit 1300. The transmitting unit 1300 sends out the passed packet.

<Process of Generating and Storing Notification Packet>

The state detecting unit 1400 requests the notification-packet generating unit 1700 to generate a notification packet with specifying the reception port (step S130).

In response to the request, the notification-packet generating unit 1700 inquires of the destination determining unit 1500 about the transmission destination of the notification packet. At this time, the specified reception port is specified.

In response to the inquiry (step S200), the destination determining unit 1500 inquires of the reception-buffer managing unit 3000 about the destination IP address 1213 of the relay packet 1210 overflowing the reception buffer 3010 corresponding to the specified reception port. In the destination determining unit 1500, setting the transmission destination of a lost packet to the transmission destination of a communication packet is stored in advance.

In response to the inquiry, the reception-buffer managing unit 3000 refers to the relay packet 13 (see FIG. 3) assumed as being lost stored in the overflow determination buffer area 3012 of the reception buffer 3010 corresponding to the specified reception port and passes the destination IP address 1213 to the destination determining unit 1500 (step S210).

After passing the destination IP address 1213 to the destination determining unit 1500, the reception-buffer managing unit 3000 deletes the relay packet 13 assumed as being lost.

After receiving the destination IP address 1213, the destination determining unit 1500 passes that destination IP address 1213 as the destination of the notification packet to the notification-packet generating unit 1700.

After receiving the destination of the notification packet, the notification-packet generating unit 1700 generates the notification packet 1710 (step S220).

Specifically, the notification-packet generating unit 1700 generates the notification packet 1710 in which the received destination of the notification packet is set to the destination IP address 1713, the IP address of the router 1000 is set to the source IP address 1712, the code indicating a loss is set to the state 1714, and the code indicating an overflow as the cause 1715. An identifier other than the IP address may be set to the source IP address 1712 as long as it allows the router 1000 to be identified.

After generating the notification packet 1710, the notification-packet generating unit 1700 determines, from the IP address set to the destination IP address 1713 and the routing table 1810, the transmission port through which the generated notification packet 1710 is to be sent out. This is the same way as a method of determining a transmission port through which a relay packet is to be sent out by the control unit 1100 (see step S150).

The notification-packet generating unit 1700 stores the generated notification packet 1710 in the notification-packet transmission buffer 3210 for the determined transmission port through the notification-packet transmission buffer managing unit 3200 (step S230).

After storing the generated notification packet 1710, the notification-packet generating unit 1700 requests the notification-packet transmission control unit 1600 to transmit the notification packet 1710 with the determined transmission port being specified (step S240).

<Process of Transmitting Notification Packet>

After receiving the request to transmit the notification packet 1710 (step S300), the notification-packet transmission control unit 1600 starts measuring time (step S310).

When a certain period of time, for example, 100 milliseconds elapses (Yes in step S310), the notification-packet transmission control unit 1600 inquiries of the relay-packet transmission buffer managing unit 3100 about whether the relay-packet transmission buffer 3110 for the specified transmission port has a vacancy.

After receiving the inquiry, the relay-packet transmission buffer managing unit 3100 checks whether the relay-packet transmission buffer 3110 for the specified transmission port has a vacancy and returns the result to the notification-packet transmission control unit 1600.

After receiving the result, the notification-packet transmission control unit 1600 starts measuring time again (step S310) when that result indicates that no vacancy exists (No in step S320).

When the received result shows that there is a vacancy (Yes in step S320), the notification-packet transmission control unit 1600 requests the notification packet corresponding to the specified transmission port from the notification-packet transmission buffer managing unit 3200.

After receiving the request, the notification-packet transmission buffer managing unit 3200 extracts the notification packet from the notification-packet transmission buffer 3210 for the specified transmission port and passes it to the notification-packet transmission control unit 1600.

After receiving the notification packet, the notification-packet transmission control unit 1600 passes the notification packet to the relay-packet transmission buffer managing unit 3100 and requests the relay-packet transmission buffer managing unit 3100 to transmit it through the specified transmission port.

After receiving the request, the relay-packet transmission buffer managing unit 3100 stores the received notification packet in the relay-packet transmission buffer 3110 for the specified transmission port (step S330).

After requesting the transmission of the notification packet, the notification-packet transmission control unit 1600 inquiries of the notification-packet transmission buffer managing unit 3200 about whether a notification packet remains in the notification-packet transmission buffer 3210 for the specified transmission port.

After receiving the inquiry, the notification-packet transmission buffer managing unit 3200 checks whether there is a notification packet in the notification-packet transmission buffer 3210 for the specified transmission port and returns the result to the notification-packet transmission control unit 1600.

After receiving the result, the notification-packet transmission control unit 1600 ends the process when the received result shows that no notification packet exists (No in step S340).

When the received result show that there is a notification packet (Yes in step S340), the notification-packet transmission control unit 1600 inquires of the relay-packet transmission buffer managing unit 3100 about whether the relay-packet transmission buffer 3110 for the specified transmission port has a vacancy, and steps S320 to S340 are repeated.

<Case 2: Transmit to Transmission Source of Lost Packet>

Figure 8:
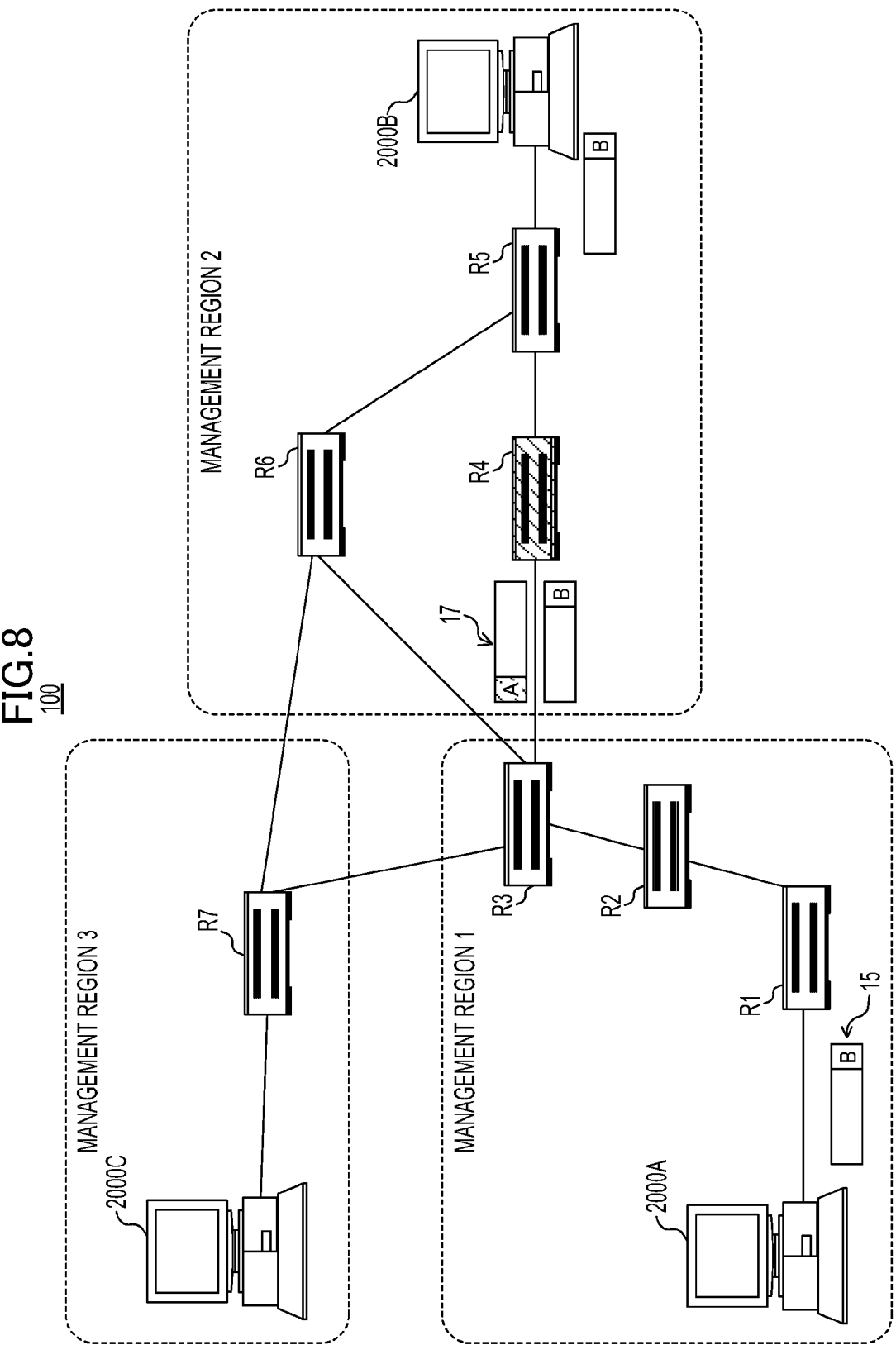
FIG. 8 illustrates processing performed by a router in a case where a notification packet is transmitted toward a transmission source of a lost relay packet.

FIG. 8 illustrates processing performed by a router in a case where a notification packet is transmitted toward the transmission source of a relay packet lost by a buffer overflow.

The router R4 in which a relay packet transmitted from the end terminal A toward the end terminal B is lost sends out a notification packet 17 toward the end terminal A.

Transmitting a notification packet to the transmission source of a lost relay packet enables a device on its route, for example, the router R3 to accurately identify the state of a packet loss, its cause, and the position of its occurrence.

Accurately indentifying the cause and position of a fault by, for example, the router R3 enables appropriate measures to be promptly taken. For example, the router R3 may regulate the number of packets to be sent out to the router R4 and send a packet to the end terminal B through the router R6.

Processes performed by the router 1000 when the transmission source of a packet lost by a buffer overflow is set to the destination of a notification packet are described below.

The processes performed by the router 1000 when a notification packet is transmitted to the transmission source of a lost packet are similar to the processes performed by the router 1000 described above with reference to FIG. 6. The processes performed by the router 1000 described above with reference to FIG. 6 are ones occurring when a notification packet is transmitted to the transmission destination of a lost packet.

Accordingly, the description focuses on a difference in the flowcharts of FIG. 6.

The difference is the process of acquiring the IP address of the transmission destination of a notification packet (step S210). This is a process performed by the destination determining unit 1500.

The process performed by the destination determining unit 1500 is described below.

After receiving the inquiry about the transmission destination of the notification packet from the notification-packet generating unit 1700, the destination determining unit 1500 inquiries of the reception-buffer managing unit 3000 about the source IP address 1212 of the relay packet 1210 overflowing the reception buffer 3010 for the specified reception port. In the destination determining unit 1500, setting the transmission source of a lost packet to the transmission destination of a communication packet is stored in advance.

After receiving the inquiry, the reception-buffer managing unit 3000 refers to the relay packet 13 (see FIG. 3) assumed as being lost stored in the overflow determination buffer area 3012 of the reception buffer 3010 for the specified reception port and passes the source IP address 1212 to the destination determining unit 1500 (step S210).

After passing the source IP address 1212 to the destination determining unit 1500, the reception-buffer managing unit 3000 deletes the lost relay packet 13.

After receiving the source IP address 1212, the destination determining unit 1500 passes the source IP address 1212 as the destination of a notification packet to the notification-packet generating unit 1700.

After receiving the destination of the notification packet, the notification-packet generating unit 1700 generates the notification packet 1710 (step S220).

<Case 3: Transmit to End Terminal Directly Causing Buffer Overflow>

Figure 9:
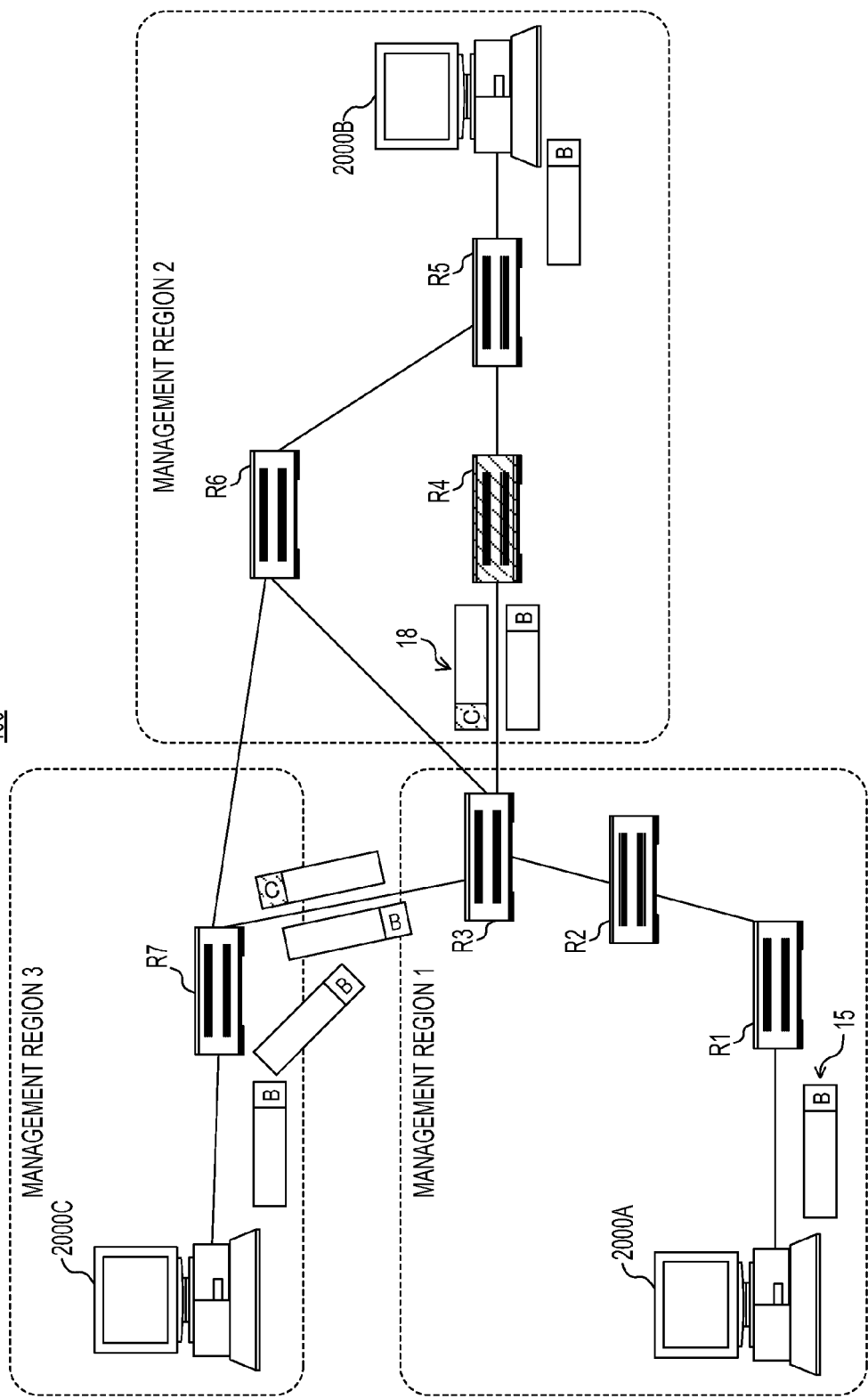
FIG. 9 illustrates processing performed by a router in a case where a notification packet is transmitted toward an end terminal directly causing a buffer overflow.

FIG. 9 illustrates processing performed by a router in a case where a notification packet is transmitted to an end terminal directly causing a buffer overflow, for example, a transmission source that sent out many packets.

The router R4 in which a packet transmitted from the end terminal A toward the end terminal B is lost sends out a notification packet 18 toward the end terminal C which transmitted the packet being the cause of overflow of packets directed toward the end terminal B.

Transmitting a notification packet to a causal end terminal enables an apparatus on its route, for example, the router R7 to accurately identify the state of a packet loss, its cause, and the position of its occurrence.

Accurately indentifying the cause and position of a fault by, for example, the router R7 enables appropriate measures to be promptly taken. For example, the router R7 may direct packets being transmitted toward the router R3 toward the router R6.

A causal end terminal may accurately identify the cause of the state of a packet loss and the position of the occurrence, so appropriate measures may be promptly taken. For example, if the end terminal C is sending out many packets because of its own fault, that fault may be detected and corrected.

Processes performed by the router 1000 when an end terminal directly causing a buffer overflow is set to the destination of a notification packet are described below.

The processes performed by the router 1000 when a notification packet is transmitted to the end terminal are similar to the processes performed by the router 1000 described above with reference to FIG. 6.

Accordingly, the description focuses on a difference in the flowcharts of FIG. 6.

The difference is the process of acquiring the IP address of the transmission destination of a notification packet (step S210). This is a process performed by the destination determining unit 1500.

The process performed by the destination determining unit 1500 is described below.

After receiving the inquiry from the notification-packet generating unit 1700 about the transmission destination of a notification packet, the destination determining unit 1500 determines the IP address of the transmission source transmitting the relay packet 1210 causing the buffer overflow. In the destination determining unit 1500, setting the transmission source of a relay packet causing a buffer overflow to the transmission destination of a communication packet is stored in advance.

First, the destination determining unit 1500 inquires of the reception-buffer managing unit 3000 about the destination IP address 1213 of the relay packet 1210 overflowing the buffer with specifying the reception port.

After receiving the inquiry, the reception-buffer managing unit 3000 refers to the relay packet 13 (see FIG. 3) assumed as being lost stored in the overflow determination buffer area 3012 of the reception buffer 3010 for the specified reception port and passes the IP address set to the destination IP address 1213 to the destination determining unit 1500.

After receiving the IP address, the destination determining unit 1500 determines the transmission port through which a packet is to be sent toward the received IP address. This is the same as a method of determining a transmission port through which a relay packet is to be sent out by the control unit 1100 (see step S150).

After determining the transmission port, the destination determining unit 1500 requests the relay-packet transmission buffer managing unit 3100 to determine the IP address of the largest number of the relay packets 1210 having the same source IP address 1212 stored in the relay-packet transmission buffer 3110 for the determined transmission port.

In response to the request, the relay-packet transmission buffer managing unit 3100 searches the relay packets 1210 stored in the relay-packet transmission buffer 3110 corresponding to the specified transmission port and passes the IP address of the largest number of the relay packets 1210 having the same source IP address 1212 to the destination determining unit 1500 (step S210). That is, the IP address of the largest number of the relay packets having the same source IP address 1212 may be considered as the IP address of a device that is transmitting many relay packets causing a buffer overflow.

After receiving the IP address, the destination determining unit 1500 passes that IP address as the destination of a notification packet to the notification-packet generating unit 1700.

After receiving the destination of the notification packet, the notification-packet generating unit 1700 generates the notification packet 1710 (step S220).

The end terminal directly causing a buffer overflow may be identified by storing the transmission sources of relay packets stored in the reception buffers 3010 as a history in the reception-buffer managing unit 3000. That is, the transmission source of the largest number of stored packets in the history may be identified as the end terminal directly causing the buffer overflow.

In the first embodiment, it is assumed that the basic buffer area 3011 of the reception buffer 3010 has a capacity that allows a single relay packet to be stored. However, if it has a capacity that allows a plurality of packets to be stored, the transmission source of the largest number of the relay packets stored may be identified as the end terminal directly causing the buffer overflow.

<Case 4: Transmit to Devices Adjacent to Router in Which Buffer Overflow Occurs>

Figure 10:
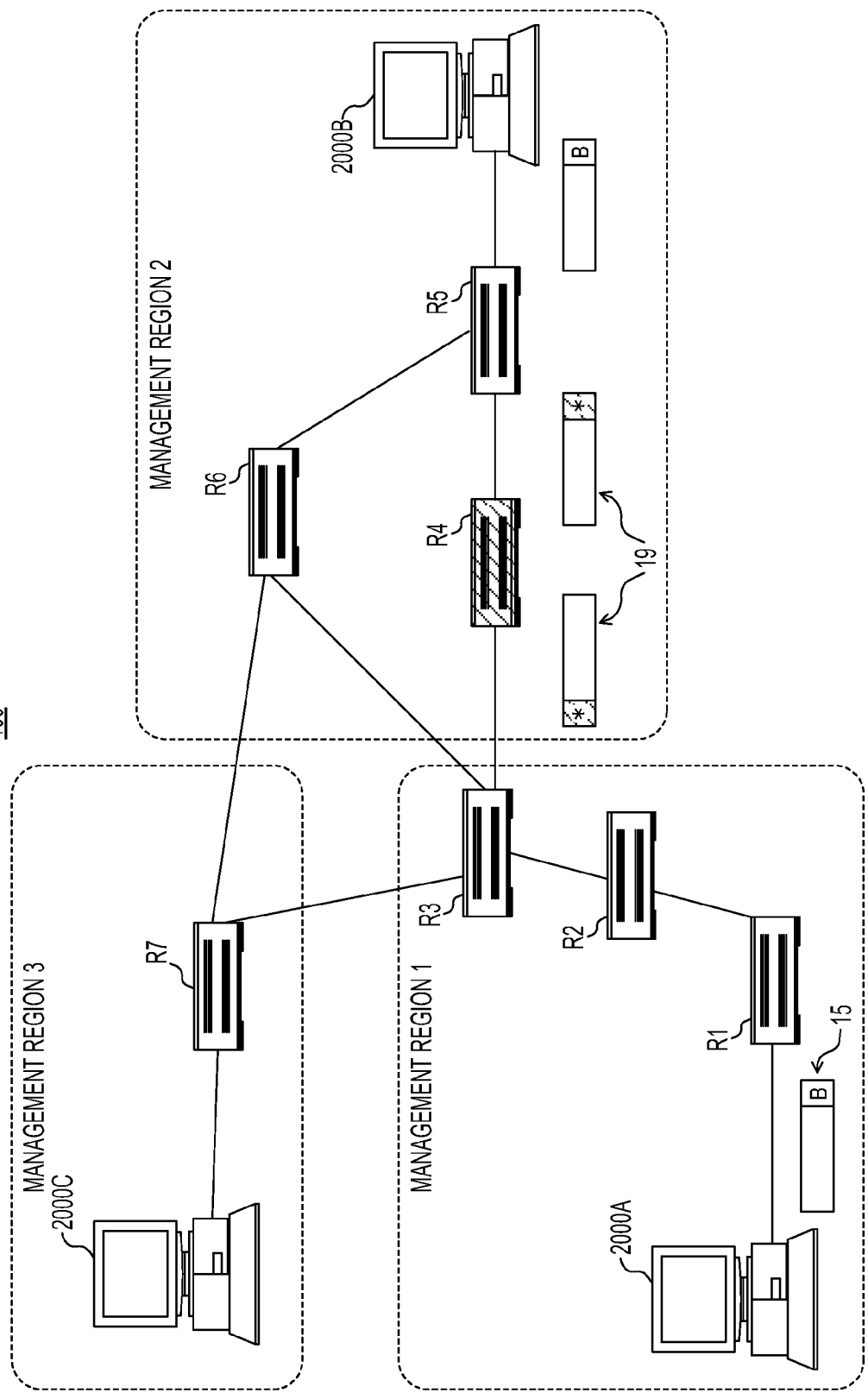
FIG. 10 illustrates processing performed by a router in a case where a notification packet is transmitted toward devices adjacent to a router in which a buffer overflow occurs.

FIG. 10 illustrates processing performed by a router in a case where a notification packet is transmitted to devices adjacent to a router in which a buffer overflow occurs.

The router R4 in which a packet transmitted from the end terminal A toward the end terminal B is lost sends out notification packets 19 toward adjacent devices. As a broadcast address, "*" is described in the destination of each of the notification packets 19.

Transmitting a notification packet to adjacent devices enables a device that exists in the same management region, for example, the router R5 to accurately identify the state of a packet loss, its cause, and the position of its occurrence.

Accurately indentifying the cause and position of a fault by, for example, the router R5 enables appropriate measures to be promptly taken. For example, the router R5 may regulate the number of packets to be sent out toward the router R4.

To transmit a notification packet to adjacent devices, a broadcast address is set to the destination IP address 1713 of the notification packet 1710.

The different types of broadcast addresses include a limited broadcast address by which a device belonging to the same network as that to which a router of the transmission source belongs is set to the transmission destination and a directed broadcast address by which a device belonging to a specified network is set to the transmission destination. In the first embodiment, a directed broadcast address is set.

Processes performed by the router 1000 when devices adjacent to a router in which a buffer overflow occurs are set to the destination of a notification packet are described below.

The processes performed by the router 1000 when a notification packet is transmitted to the adjacent device are similar to the processes performed by the router 1000 described above with reference to FIG. 6.

Accordingly, the description focuses on a difference in the flowcharts of FIG. 6.

The difference is the process of acquiring the IP address of the transmission destination of a notification packet (step S210). This is a process performed by the destination determining unit 1500.

The process performed by the destination determining unit 1500 is described below.

After receiving the inquiry about the transmission destination of the notification packet from the notification-packet generating unit 1700, the destination determining unit 1500 generates a directed broadcast address in which only the host address portion of the IP address of the router 1000 is all ones. For example, when the IP address of the router R4 is "10.25.30.22" and the network address is "10.25.30," the directed broadcast address is "10.25.30.255." In the destination determining unit 1500, setting adjacent devices to the transmission destination of a communication packet is stored in advance.

The destination determining unit 1500 passes the generated directed broadcast address as the destination of the notification packet to the notification-packet generating unit 1700 (step S210).

After receiving the destination of the notification packet, the notification-packet generating unit 1700 generates the notification packet 1710 (step S220).

<Modification 1>

In the first embodiment, the notification packet 1710 (see FIG. 4B) containing the state of an occurring fault and its cause is transmitted. In the modification 1, a case in which the notification packet contains other kinds of information is described.

In the modification 1, the notification packet contains the IP address of an end terminal that is transmitting many packets being the cause of a buffer overflow and the identifier of a reception port being a reception interface that is receiving the many packets.

A notification packet containing the direction of an end terminal that causes a buffer overflow, that is, the IP address of the end terminal and the reception port enables another device that receives the notification packet to accurately identify the direction of the causal end terminal. Thus, appropriate measures may be promptly taken.

For example, an instruction to regulate the number of packets to be sent out may be transmitted to the causal end terminal. Another device may take measures, such as changing the route of packets to the reception port receiving the many packets.

Figure 11:
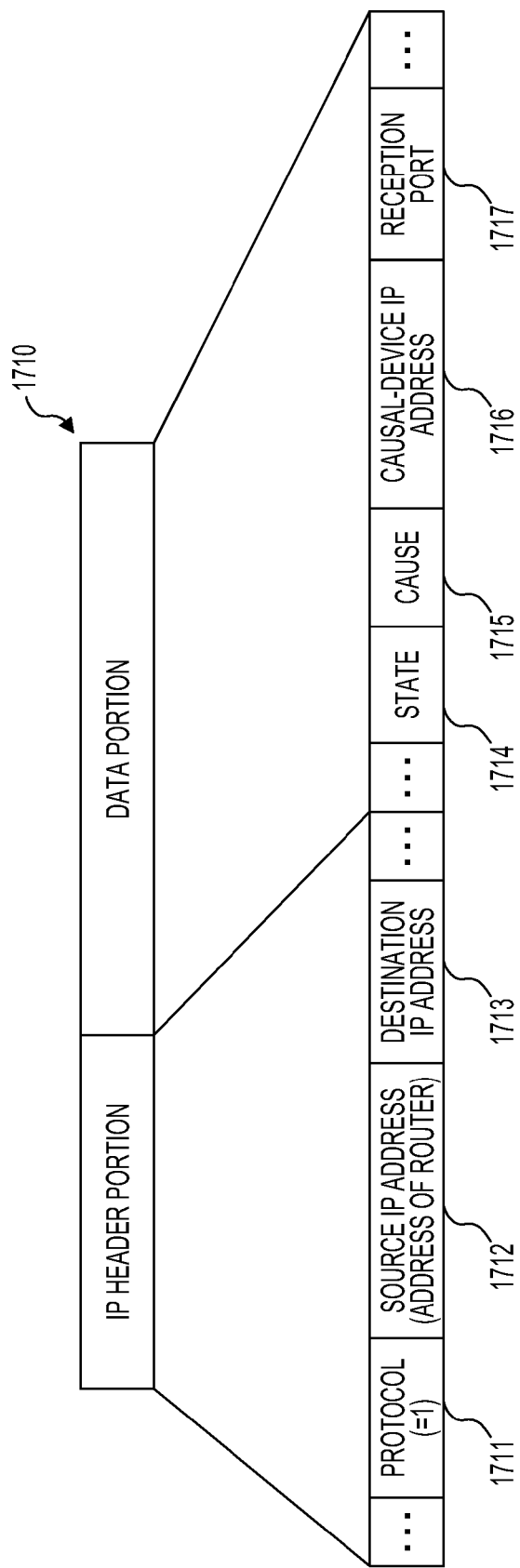
FIG. 11 illustrates an example of a configuration and content of a notification packet according to a modification 1.

FIG. 11 illustrates an example of a configuration and content of a notification packet according to the modification 1.

In the data portion of the notification packet 1710 described with reference to FIG. 4B, a causal-device IP address 1716 and a reception port 1717 are added.

The causal-device IP address 1716 indicates the IP address of an end terminal that is transmitting many packets being the cause of a buffer overflow.

The reception port 1717 indicates the identifier of a reception port that is receiving a packet from the IP address represented by the causal-device IP address 1716.

Specifically, the causal-device IP address 1716 is determined in the following way.

The causal-device IP address 1716 is the IP address determined as the transmission destination of a communication packet in the section <Case 3: Transmit to End Terminal Directly Causing Buffer Overflow> in the first embodiment.

That is, the IP address of the largest number of the relay packets 1210 having the same source IP address 1212 stored in the relay-packet transmission buffer 3110 of the transmission port through which the lost packet should have been sent out is the IP address of the end terminal directly causing the buffer overflow.

In generating the notification packet 1710, the notification-packet generating unit 1700 instructs the destination determining unit 1500 to determine the IP address of the end terminal directly causing the buffer overflow and sets the acquired IP address to the causal-device IP address 1716.

The reception port 1717 is determined by associating the transmission source of a relay packet and the reception port through which the relay packet was received with each other.

Figure 12:
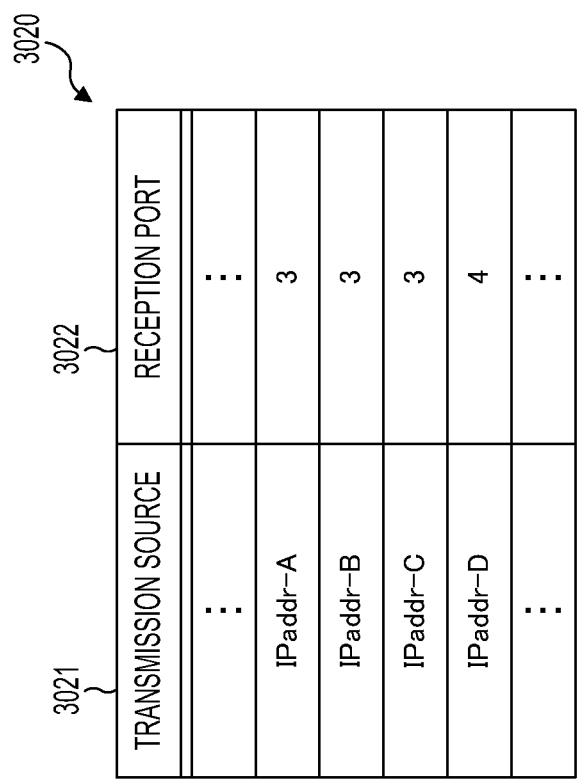
FIG. 12 illustrates an example of a configuration and content of received-packet information.

Specifically, first, the reception-buffer managing unit 3000 stores received-packet information 3020 illustrated in FIG. 12.

FIG. 12 illustrates an example of a configuration and content of the received-packet information 3020.

The received-packet information 3020 includes a source 3021 and a reception port 3022.

The source 3021 indicates the IP address of a transmission source of a received relay packet.

The reception port 3022 indicates the reception port through which a relay packet whose transmission source is the IP address represented by the source 3021 was received.

Every time the relay packet 1210 is received from the receiving unit 1200, the reception-buffer managing unit 3000 stores the source IP address 1212 of the received relay packet 1210 and the reception port in association with each other.

In generating the notification packet 1710, the notification-packet generating unit 1700 passes the IP address set to the causal-device IP address 1716 to the reception-buffer managing unit 3000 and inquires about the reception port.

After receiving the inquiry, the reception-buffer managing unit 3000 returns the identifier of the reception port set to the reception port 3022 of a record in which the source 3021 of the received-packet information 3020 is the same as the received IP address to the notification-packet generating unit 1700.

The notification-packet generating unit 1700 sets the received identifier of the reception port to the reception port 1717.

A notification packet may contain the source IP address 1212 of the lost relay packet 1210 and/or the destination IP address 1213 thereof. In the case of a real-time transport protocol (RTP) relay packet, a notification packet may contain information, such as the sequence number of the relay packet.

<Modification 2>

In the first embodiment, when an overflow of relay packets from the reception buffer 3010 starts, a buffer overflow is determined to occur and a notification packet is transmitted.

In the modification 2, at the point in time when vacancies in the reception buffer 3010 become limited, a notification packet is transmitted as warning.

In the first embodiment, the basic buffer area 3011 of the reception buffer 3010 has a capacity that allows a single relay packet to be stored. In the modification 2, it has a capacity that allows a plurality of relay packets to be stored.

Transmitting a notification packet as warning enables another device to be notified of the possibility that a packet loss resulting from a buffer overflow will occur. Therefore, appropriate measures may be promptly taken before trouble arises.

For example, a notification packet is transmitted to the transmission source of a relay packet that has recently been received among relay packets stored in the reception buffer 3010 whose vacancies become limited. This enables another router on the route to the transmission source to regulate the traffic of packets to a router that transmitted the notification packet. Regulating the traffic of packets by another router makes the occurrence of a buffer overflow in a router that transmitted the notification packet less likely. This also enables a probe device on the route to analyze the content of a notification packet and appropriate measures to be promptly taken.

In this case, in storing a relay packet in the basic buffer area 3011 of the reception buffer 3010, the reception-buffer managing unit 3000 determines whether the vacancy rate of the basic buffer area 3011 is equal to or larger than a specific value, for example, 40%. When the vacancy rate is lower than the specific value, notification is provided to the state detecting unit 1400.

When the vacancy rate of the basic buffer area 3011 is lower than the specific value, the state detecting unit 1400 determines that a notification packet is to be transmitted and thus requests the notification-packet generating unit 1700 to generate the notification packet.

Code indicating the possibility that a packet loss will occur is set to the state 1714 of the notification packet 1710. Code indicating that the remaining free space of the buffer is lower than the specific value is set to the cause 1715.

The notification packet may contain a usage rate of the basic buffer area 3011, the source IP address 1212 of the relay packet 1210 that is likely to be lost, and/or the destination IP address 1213 thereof. In the case of an RTP relay packet, a notification packet may contain information, such as the sequence number of the relay packet.

<Modification 3>

In the first embodiment, every time it is determined that a buffer overflow occurs, a notification packet is generated. In the modification 3, the number of notification packets to be transmitted is adjusted.

For example, minimizing the number of notification packets may reduce an increase in additional load on a network.

The process of generating and storing a notification packet according to the modification 3 is described below.

Figure 13:
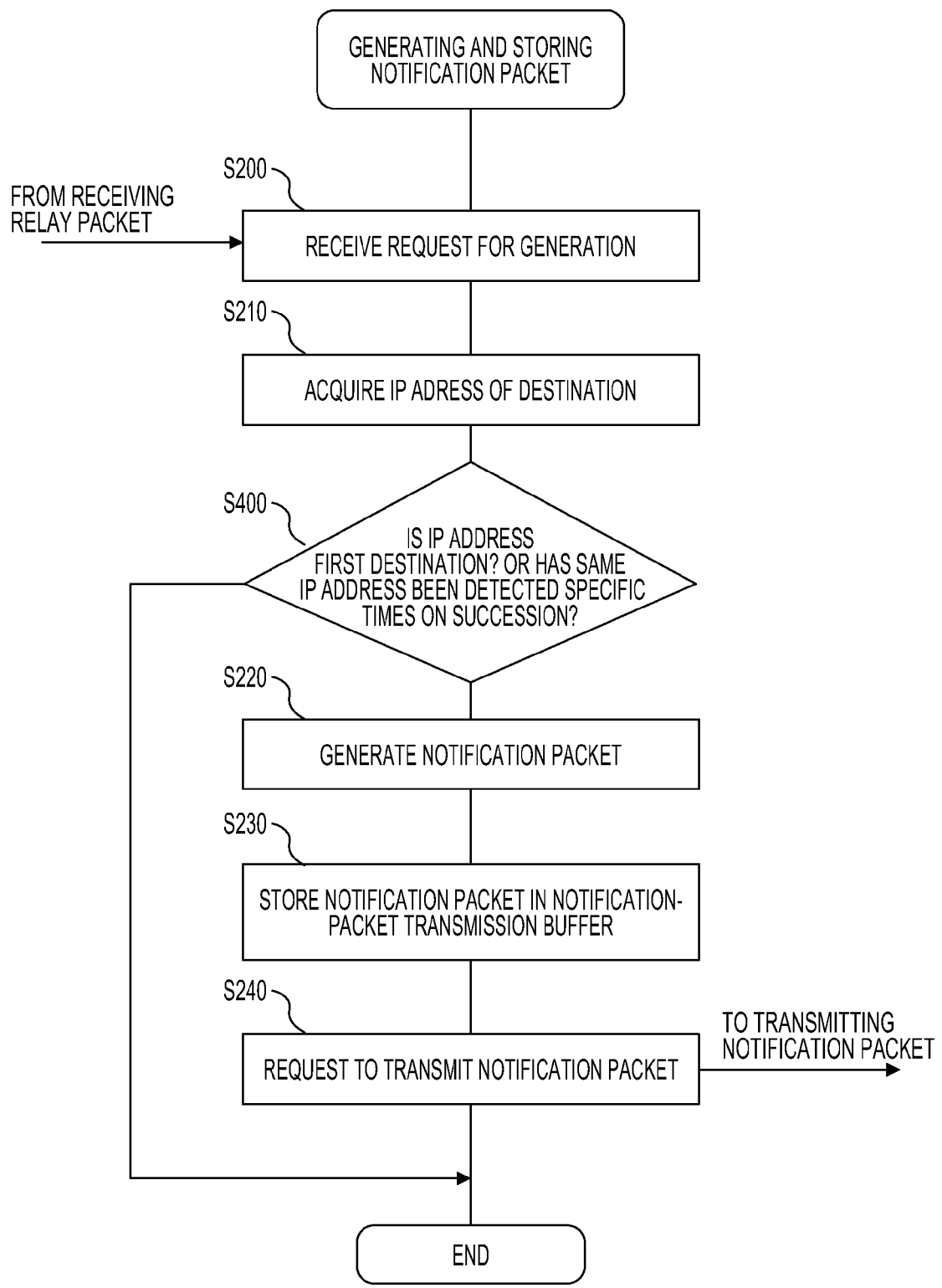
FIG. 13 illustrates processing of generating and storing a notification packet according to a modification 3 performed by a router.

FIG. 13 illustrates processing of generating and storing a notification packet according to the modification 3.

The process of generating and storing a notification packet according to the modification 3 is similar to that according to the first embodiment described with reference to FIG. 6.

The modification 3 is different in that it is determined in step S400 whether a notification packet is to be generated.

In the modification 3, when the IP address of the transmission destination of the notification packet acquired in step S210 is the first transmission destination (Yes in step S400), a notification packet is generated. Note that if an acquired transmission destination has not been obtained for a certain period of time, the transmission destination is assumed as being the first transmission destination.

When the same IP address is acquired a specific number of times in succession (Yes in step S400), a notification packet is generated. For example, when the same IP address is acquired 10 times in succession, a notification packet is generated. This may avoid notification packets from being sequentially transmitted to the same destination.

Even when notification packets have the same destination, for different states or causes, they may be transmitted.

Second Embodiment

In the first embodiment, when the reception buffer 3010 of the router 1000 overflows, a notification packet is transmitted. In the second embodiment, a case is described where, when the relay-packet transmission buffer 3110 overflows, a notification packet is transmitted.

The second embodiment is described also using the network 100 (see FIG. 1) employed in the description for the first embodiment.

<Function>

In the first embodiment, the reception-buffer managing unit 3000 detects the occurrence of an overflow in the reception buffer 3010 and notifies the state detecting unit 1400. The second embodiment is different in that the relay-packet transmission buffer managing unit 3100 detects the occurrence of an overflow in the relay-packet transmission buffer 3110 and notifies the state detecting unit 1400.

Accordingly, a router described in the second embodiment has substantially the same functions as the router 1000 described in the first embodiment, except for the functions related to the above difference. Accordingly, the description focuses on the difference with reference to the functional block diagram of the router 1000 illustrated in FIG. 2.

The relay-packet transmission buffer managing unit 3100 in the second embodiment has the function of detecting the occurrence of an overflow of packets and notifying the state detecting unit 1400, in addition to the functions of the relay-packet transmission buffer managing unit 3100 in the first embodiment.

In response to the notification about the state of the relay-packet transmission buffer 3110 from the relay-packet transmission buffer managing unit 3100, the state detecting unit 1400 in the second embodiment determines from the notification that a notification packet is to be transmitted when detecting the occurrence of a buffer overflow.

Similar to the destination determining unit 1500 in the first embodiment, the destination determining unit 1500 in the second embodiment determines the IP address of the destination of the notification packet generated by the router 1000. Note that the destination determining unit 1500 in the second embodiment determines the IP address of the destination by referring to the relay packet overflowing the relay-packet transmission buffer 3110, whereas, in contrast, the destination determining unit 1500 in the first embodiment determines it by referring to the relay packet overflowing the reception buffer 3010.

<Buffer>

Next, how buffers are used in the second embodiment is described below with reference to FIG. 14.

Figure 14:
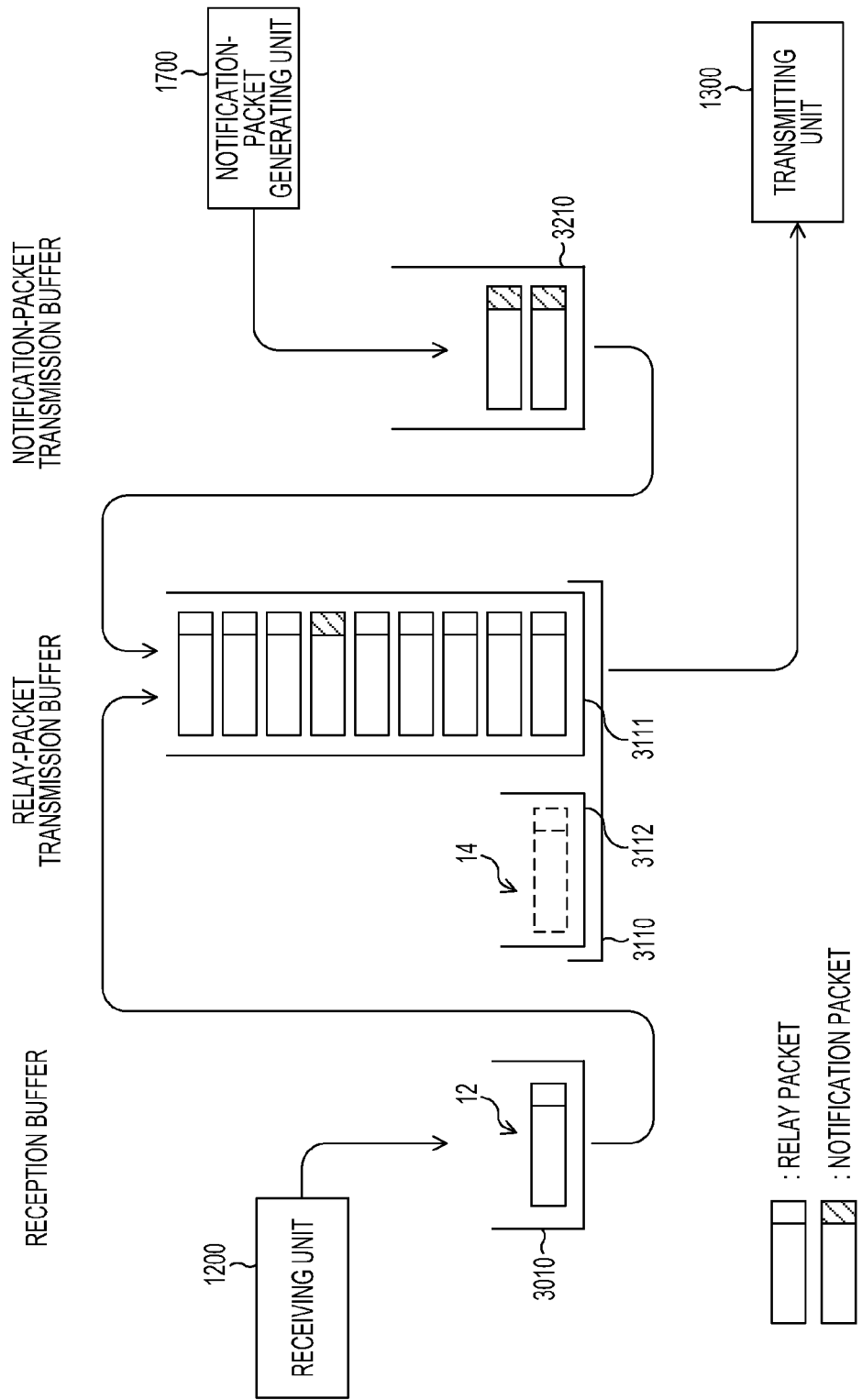
FIG. 14 illustrates an example of usage of buffers (second embodiment)

FIG. 14 illustrates an example of usage of buffers in the second embodiment.

In the first embodiment, the reception buffer 3010 has two buffer areas: the basic buffer area 3011 and the overflow determination buffer area 3012. In the second embodiment, the relay-packet transmission buffer 3110 has two buffer areas: a basic buffer area 3111 and an overflow determination buffer area 3112.

When a process of forwarding relay packets is normally performed, a transmission port being the sending destination of a relay packet stored in the reception buffer 3010 is determined by the control unit 1100, and the relay packet with the determined transmission port being specified is passed to the relay-packet transmission buffer managing unit 3100.

The relay-packet transmission buffer managing unit 3100 stores the passed relay packet in the basic buffer area 3111 of the relay-packet transmission buffer 3110 for the specified transmission port.

However, at this time, the basic buffer area 3111 may have no free area for accommodating the relay packet that the relay-packet transmission buffer managing unit 3100 attempts to store.

In this case, the relay-packet transmission buffer managing unit 3100 stores the passed relay packet in the overflow determination buffer area 3112. In the second embodiment, when a relay packet 14 is stored in the overflow determination buffer area 3112, it is assumed that a buffer overflow occurs.

That is, when storing the relay packet 14 in the overflow determination buffer area 3112, the relay-packet transmission buffer managing unit 3100 detects the occurrence of a buffer overflow.

The relay packet stored in the basic buffer area 3111 is considered to be buffered, and thus it is subjected to a normal forwarding process. In contrast, the relay packet 14 stored in the overflow determination buffer area 3112 is assumed as a lost packet, and thus it is not subjected to a forwarding process.

<Packet>

Packets used in the network 100 in the second embodiment are the same as those in the first embodiment described with reference to FIGS. 4A and 4B.

<Data>

Data used in the network 100 in the second embodiment is the same as that in the first embodiment described with reference to FIG. 5.

<Operation>

Operation of the router 1000 in the second embodiment is described below with reference to FIG. 15. The processes performed by the router 1000 in the second embodiment are similar to those in the first embodiment, so the description focuses on differences.

In the second embodiment, four transmission destinations of a notification packet are described in four cases, similarly to in the first embodiment. The first case is that the destination of a packet lost by a buffer overflow is set to the transmission destination of a notification packet. The second case is that the transmission source of a packet lost by a buffer overflow is set to the transmission destination of a notification packet. The third case is that an end terminal directly causing a buffer overflow is set to the transmission destination of a notification packet. The fourth case is that devices adjacent to a router in which a buffer overflow occurs are set to the transmission destination of a notification packet.

<Case 1: Transmit to Destination of Lost Packet>

Figure 15:
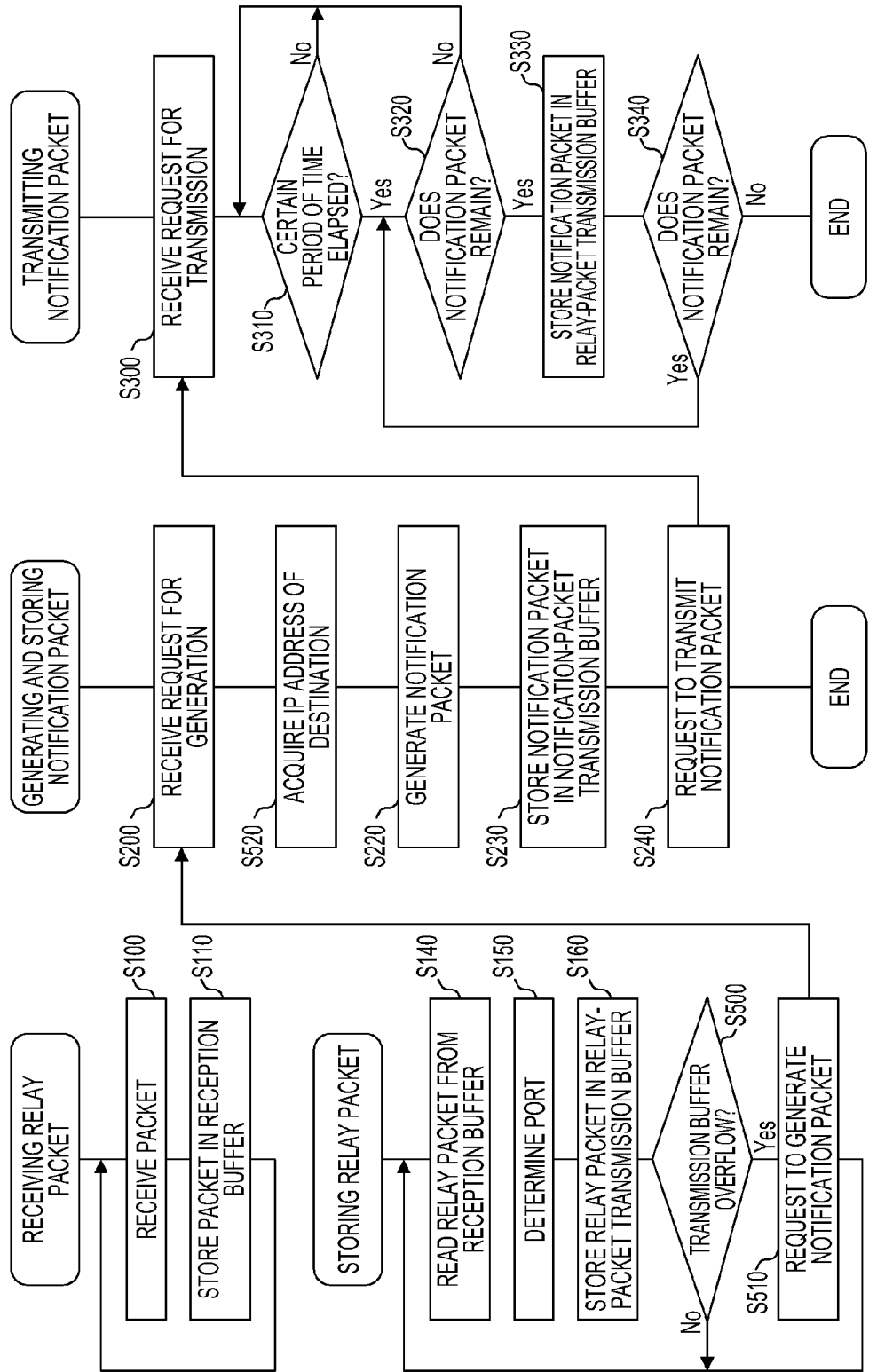
FIG. 15 illustrates processing performed by a router when a buffer overflow occurs (second embodiment)

FIG. 15 illustrates processing performed by the router 1000 when a buffer overflow occurs. In FIG. 15, the steps having the same numbers as those in the flowcharts of FIG. 6 are substantially the same as in the first embodiment.

The processes performed by the router 1000 in the second embodiment when a buffer overflow occurs are described in three parts: a process of receiving and storing a relay packet; a process of generating and storing a notification packet; a process of transmitting a notification packet.

<Process of Receiving and Storing Relay Packet>

The process of receiving a relay packet in the second embodiment is different from that in the first embodiment in that detecting the occurrence of a buffer overflow in the reception buffer 3010 by the reception-buffer managing unit 3000 (step S120 in FIG. 6) is not performed and requesting a notification packet (step S130 in FIG. 6) is not performed.

The process of storing a relay packet in the second embodiment is different from that in the first embodiment in that the relay-packet transmission buffer managing unit 3100 detects the occurrence of a buffer overflow in the relay-packet transmission buffer 3110 (step S500) and requests generating a notification packet (step S510).

In detail, the relay-packet transmission buffer managing unit 3100 stores the received relay packet 1210 in the basic buffer area 3111 of the relay-packet transmission buffer 3110 of the transmission port requested by the control unit 1100 (step S160).

When the basic buffer area 3111 has no vacancy and the passed relay packet 12 is thus stored in the overflow determination buffer area 3112, the relay-packet transmission buffer managing unit 3100 assumes that a buffer overflow occurs and notifies the state detecting unit 1400 of its occurrence and the identifier of the transmission port.

In response to the notification, the state detecting unit 1400 determines that the buffer overflow occurs (Yes in step S500) and requests the notification-packet generating unit 1700 to generate a notification packet (step S510). At this time, the transmission port is specified.

After that, flow returns to step S140, and the process is repeated from step S140.

When the relay-packet transmission buffer 3110 does not overflow (No in step S500), flow returns to step S140, and the process is repeated from step S140.

<Process of Generating and Storing Notification Packet>

The process of generating and storing a notification packet in the second embodiment is different from that in the first embodiment in acquiring the IP address of the destination (step S210 in FIG. 6 and step S520 in FIG. 15).

In detail, in response to the request to generate the notification packet in step S510, the state detecting unit 1400 requests the notification-packet generating unit 1700 to generate the notification packet with specifying the transmission port.

In response to the request, the notification-packet generating unit 1700 inquires of the destination determining unit 1500 about the transmission destination of the notification packet. At this time, the specified transmission port is specified.

In response to the inquiry (step S200), the destination determining unit 1500 inquires of the relay-packet transmission buffer managing unit 3100 about the destination IP address 1213 of the relay packet 1210 overflowing the relay-packet transmission buffer 3110 for the specified transmission port. In the destination determining unit 1500, setting the transmission destination of a lost packet to the transmission destination of a communication packet is stored in advance.

In response to the inquiry, the relay-packet transmission buffer managing unit 3100 refers to the relay packet 14 (see FIG. 14) assumed as being lost stored in the overflow determination buffer area 3112 of the relay-packet transmission buffer 3110 for the specified transmission port and passes the destination IP address 1213 to the destination determining unit 1500 (step S520).

After passing the destination IP address 1213 to the destination determining unit 1500, the relay-packet transmission buffer managing unit 3100 deletes the relay packet 14 assumed as being lost.

After receiving the destination IP address 1213, the destination determining unit 1500 passes that destination IP address 1213 as the destination of the notification packet to a notification-packet generating unit 1700.

After receiving the destination of the notification packet, the notification-packet generating unit 1700 generates the notification packet 1710 (step S220).

<Process of Transmitting Notification Packet>

The process of transmitting a notification packet in the second embodiment is substantially the same as that in the first embodiment.

<Case 2: Transmit to Transmission Source of Lost Packet>

The processes performed by the router 1000 in the case where a notification packet is transmitted to the transmission source of a lost packet in the second embodiment are substantially the same as those performed by the router 1000 described with reference to FIG. 15.

This case is different in acquiring the IP address of the transmission destination of a notification packet (step S520). This acquisition is performed by the destination determining unit 1500.

After receiving the inquiry about the transmission destination of the notification packet from the notification-packet generating unit 1700, the destination determining unit 1500 inquiries of the relay-packet transmission buffer managing unit 3100 about the source IP address 1212 of the relay packet 1210 overflowing the relay-packet transmission buffer 3110 for the specified transmission port. In the destination determining unit 1500, setting the transmission source of a lost packet to the transmission destination of a communication packet is stored in advance.

After receiving the inquiry, the relay-packet transmission buffer managing unit 3100 refers to the relay packet 14 (see FIG. 14) assumed as being lost stored in the overflow determination buffer area 3112 of the relay-packet transmission buffer 3110 for the specified transmission port and passes the source IP address 1212 to the destination determining unit 1500 (step S520).

<Case 3: Transmit to End Terminal Directly Causing Buffer Overflow>

The processes performed by the router 1000 in the case where a notification packet is transmitted to an end terminal directly causing a buffer overflow in the second embodiment are substantially the same as those performed by the router 1000 described with reference to FIG. 15.

This case is different in acquiring the IP address of the transmission destination of a notification packet (step S520). This acquisition is performed by the destination determining unit 1500.

After receiving the inquiry about the transmission destination of the notification packet from the notification-packet generating unit 1700, the destination determining unit 1500 determines the IP address of the transmission source transmitting the relay packet 1210 being the cause of the buffer overflow. In the destination determining unit 1500, setting the transmission source of a relay packet being the cause of a buffer overflow to the transmission destination of a communication packet is stored in advance.

First, the destination determining unit 1500 requests the relay-packet transmission buffer managing unit 3100 to determine the IP address of the largest number of the relay packets 1210 having the same source IP address 1212 stored in the relay-packet transmission buffer 3110 for the specified transmission port.

In response to the request, the relay-packet transmission buffer managing unit 3100 searches the relay packets 1210 stored in the relay-packet transmission buffer 3110 corresponding to the specified transmission port and passes the IP address of the largest number of the relay packets 1210 having the same source IP address 1212 to the destination determining unit 1500 (step S520). That is, the IP address of the largest number of the relay packets having the same source IP address 1212 may be considered as the IP address of a device that is transmitting many relay packets causing a buffer overflow.

<Case 4: Transmit to Devices Adjacent to Router in Which Buffer Overflow Occurs>

The processes performed by the router 1000 in the case where a notification packet is transmitted to devices adjacent to a router in which a buffer overflow occurs in the second embodiment are substantially the same as those performed by the router 1000 described with reference to FIG. 15.

<Modification 1>

In the modification 1 of the first embodiment, a communication packet contains the IP address of an end terminal that is transmitting many packets being the cause of a buffer overflow and the identifier of a reception port being a reception interface that is receiving the many packets.

In the modification 1 of the second embodiment, a communication packet contains the IP address of an end terminal that is transmitting many packets being the cause of a buffer overflow and the identifier of a transmission port through which the many packets are to be transmitted.

A notification packet containing the direction of an end terminal that causes a buffer overflow, that is, the IP address of the end terminal and the transmission port enables another device that receives the notification packet to accurately identify the direction of the causal end terminal. Thus, appropriate measures may be promptly taken.

For example, an instruction to regulate the number of packets to be sent out through the transmission port corresponding to a buffer overflow may be transmitted to the causal end terminal. Another device may take measures, such as changing the route of transmitting packets through the transmission port through which the many packets is being transmitted.

A communication packet transmitted in the modification 1 of the second embodiment may be the one in which the reception port 1717 of the notification packet 1710 (see FIG. 11) in the modification 1 of the first embodiment is replaced with the transmission port, for example.

A notification packet may contain the IP address of the largest number of packets having the same destination IP address among many packets being the cause of a transmission buffer overflow.

<Modification 2>

In the modification 2 of the first embodiment, at the point in time when vacancies in the reception buffer 3010 become limited, a notification packet is transmitted as warning.

In the modification 2 of the second embodiment, at the point in time when vacancies in the relay-packet transmission buffer 3110 become limited, a notification packet is transmitted as warning.

In detail, in storing a relay packet in the basic buffer area 3111 of the relay-packet transmission buffer 3110, the relay-packet transmission buffer managing unit 3100 determines whether the vacancy rate of the relay-packet transmission buffer 3110 is equal to or larger than a specific value, for example, 40%. When the vacancy rate is lower than the specific value, notification is provided to the state detecting unit 1400.

When the vacancy rate of the basic buffer area 3111 is lower than the specific value, the state detecting unit 1400 determines that a notification packet is to be transmitted and thus requests the notification-packet generating unit 1700 to generate the notification packet.

Code indicating the possibility that a packet loss will occur is set to the state 1714 of the notification packet 1710. Code indicating that the remaining free space of the buffer is lower than the specific value is set to the cause 1715.

Third Embodiment

In the first embodiment, a buffer overflow is described as an example of a fault occurring in a router being a relay device.

In the third embodiment, a case where a late collision occurs is described as an example.

In the case where a late collision occurs, one cause of the late collision is considered to be incorrectness of the setting for the communication mode of each port of a router. The setting for the communication mode is the one of setting either one of full-duplex communication and half-duplex communication (the same applies to the following description).

Accordingly, transmitting a notification packet by a router that detects a late collision to the transmission destination of a relay packet assumed to have been unable to be transmitted enables a router and end terminal on the route to accurately identify the state of the occurrence of a late collision and the position of its occurrence.

Transmitting a notification packet to another place other than the transmission destination of a relay packet, for example, to the transmission source thereof enables a router, probe device, and end terminal on the route to accurately identify the state of the occurrence of a late collision and the position of its occurrence.

Accordingly, a router on the route may detect the possibility that the setting for the communication mode of a port that transmits or receives a notification packet is mismatching. Thus, measures, such as changing the communication mode, may be taken.

Here, functions of the router 1000 in the third embodiment are described with reference to FIG. 16.

Figure 16:
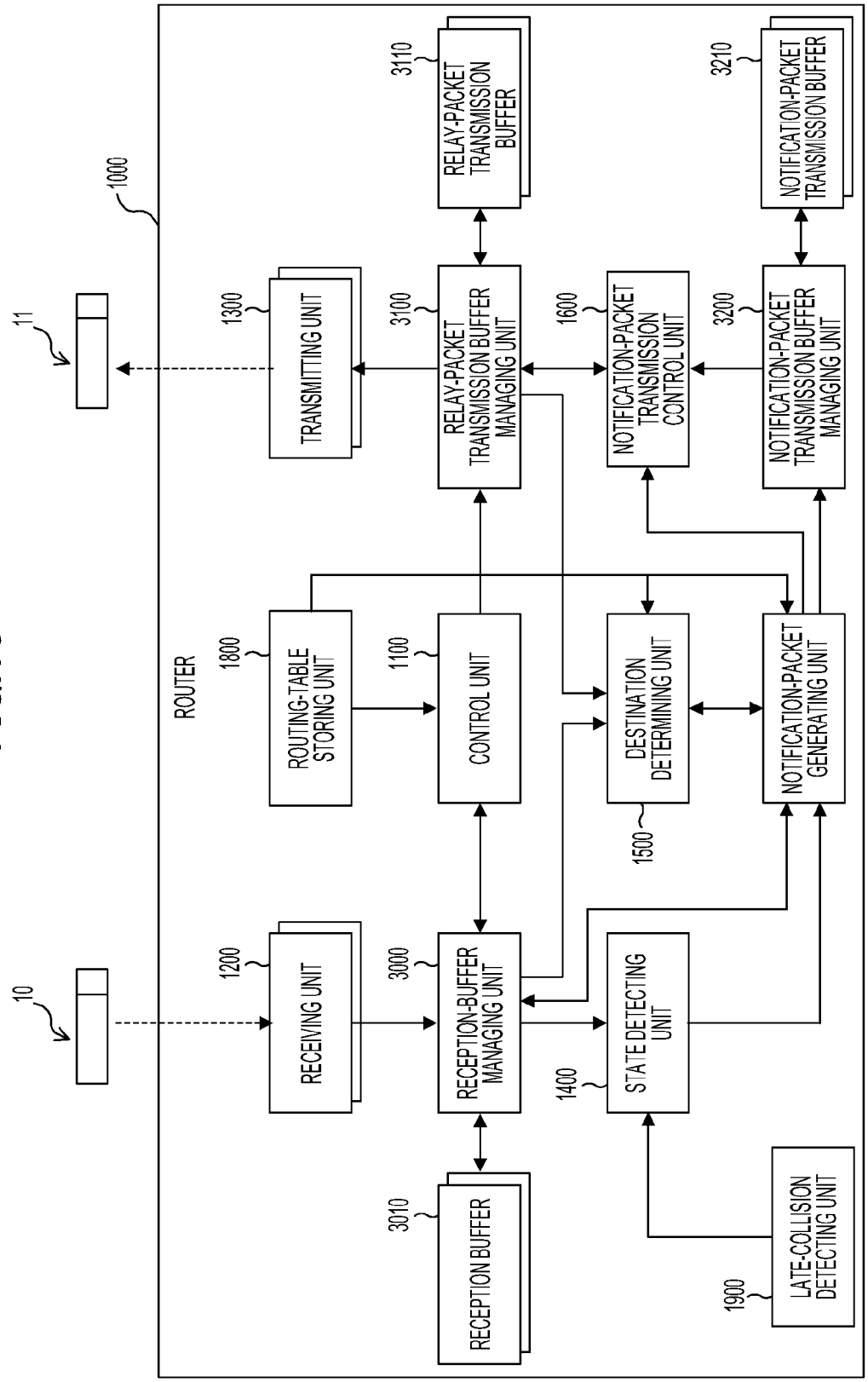
FIG. 16 illustrates an example of a functional configuration of a router (third embodiment)

FIG. 16 illustrates an example of a functional configuration of the router 1000 in the third embodiment.

The router in the first embodiment described with reference to FIG. 2 notifies the state detecting unit 1400 when the reception-buffer managing unit 3000 detects an overflow in the reception buffer 3010.

The third embodiment is different in that, when detecting the occurrence of a late collision, a late-collision detecting unit 1900 notifies the state detecting unit 1400 of that occurrence.

Accordingly, the router described in the third embodiment has substantially the same functions as in the router 1000 described in the first embodiment, except that the late-collision detecting unit 1900 exists and a notification packet indicating the occurrence of a late collision is transmitted.

The description focusing on differences from the router 1000 in the first embodiment among the functions of the router 1000 in the third embodiment is provided below.

The late-collision detecting unit 1900 detects the occurrence of a late collision after the router 1000 forwards a relay packet. At this time, the transmission port in which the late collision occurs is also detected.

After detecting the occurrence of the late collision, the late-collision detecting unit 1900 notifies the state detecting unit 1400 of that occurrence and the identifier of the transmission port in which the late collision occurs.

When receiving the notification indicating the occurrence of the late collision and the identifier of the transmission port, the state detecting unit 1400 in the third embodiment determines that a notification packet is to be transmitted and requests the notification-packet generating unit 1700 to generate the notification packet.

The destination determining unit 1500 in the third embodiment determines the IP address of the destination of the notification packet generated by the router 1000, as in the case of the destination determining unit 1500 in the first embodiment. This destination IP address is acquired from the relay-packet transmission buffer managing unit 3100. This is because a relay packet that has recently been forwarded from the transmission port in which a late collision occurs is assumed to cause the late collision.

Accordingly, the relay-packet transmission buffer managing unit 3100 in the third embodiment stores the relay packet that has recently been forwarded from each transmission port.

In response to an inquiry from the destination determining unit 1500, the relay-packet transmission buffer managing unit 3100 returns the IP address of the transmission destination or the transmission source of the stored recently forwarded relay packet.

Figure 17:
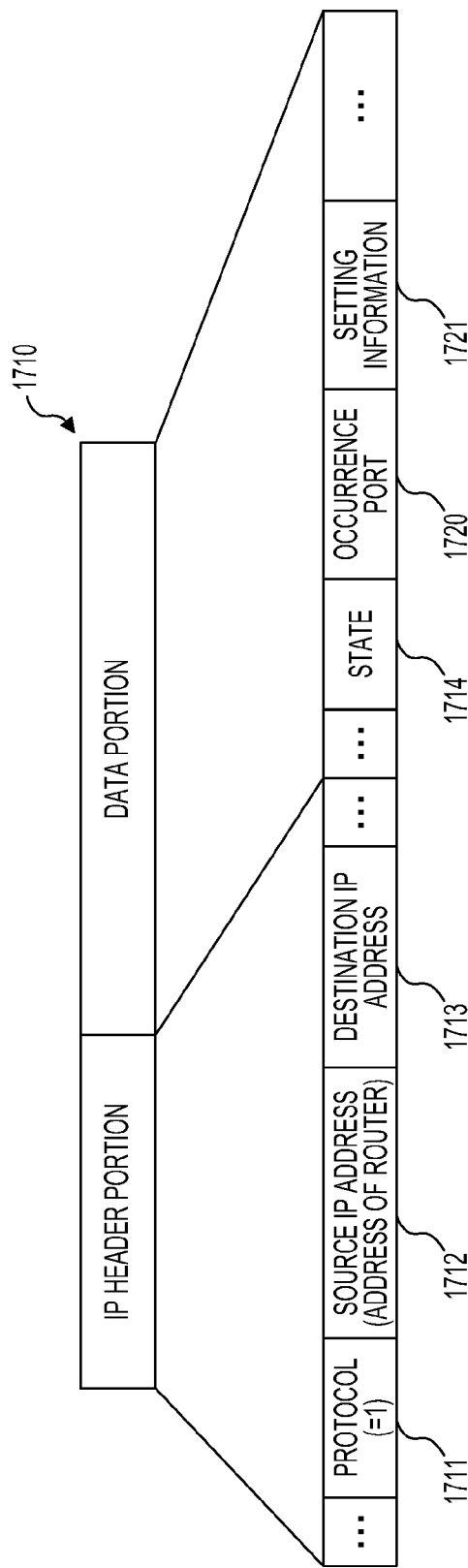
FIG. 17 illustrates an example of a configuration and content of a notification packet (third and fourth embodiments)

FIG. 17 illustrates an example of a configuration and content of a notification packet in the third embodiment.

In the notification packet in the present embodiment, the cause 1715 of the data portion of the notification packet 1710 described in FIG. 4B is replaced with an occurrence port 1720 and setting information 1721.

The occurrence port 1720 indicates the identifier of the transmission port in which a late collision occurs.

The setting information 1721 indicates the communication mode set in the transmission port represented by the occurrence port 1720, i.e., full-duplex communication or half-duplex communication. In the third embodiment, code indicating "the occurrence of a late collision" is set in the state 1714.

Fourth Embodiment

In the third embodiment, the case where a late collision occurs is described as an example of a fault occurring in a router being a relay device.

In the fourth embodiment, a change occurs in the state of a router, not a fault occurring in the router. A case is described where the setting for the communication mode of a port, i.e., the setting of full-duplex communication or half-duplex communication is changed as an example of the change of the state of the router.

When the setting for the communication mode is changed, a late collision may occur because of mismatching of the set mode.

Accordingly, when the setting for the communication mode of a port is changed, measures, such as changing the communication mode before a fault occurs, may be taken by a router subjected to the change itself notifying another router of the changed communication mode.

Transmitting a notification packet to adjacent devices enables the adjacent devices to change the setting of their ports if necessary. Transmitting a notification packet to the transmission destination of a relay packet to be transmitted through the port subjected to the change of the setting for the communication mode enables a router on the route to change the setting of the port if necessary.

Functions of the router 1000 in the fourth embodiment are described with reference to FIG. 18.

Figure 18:
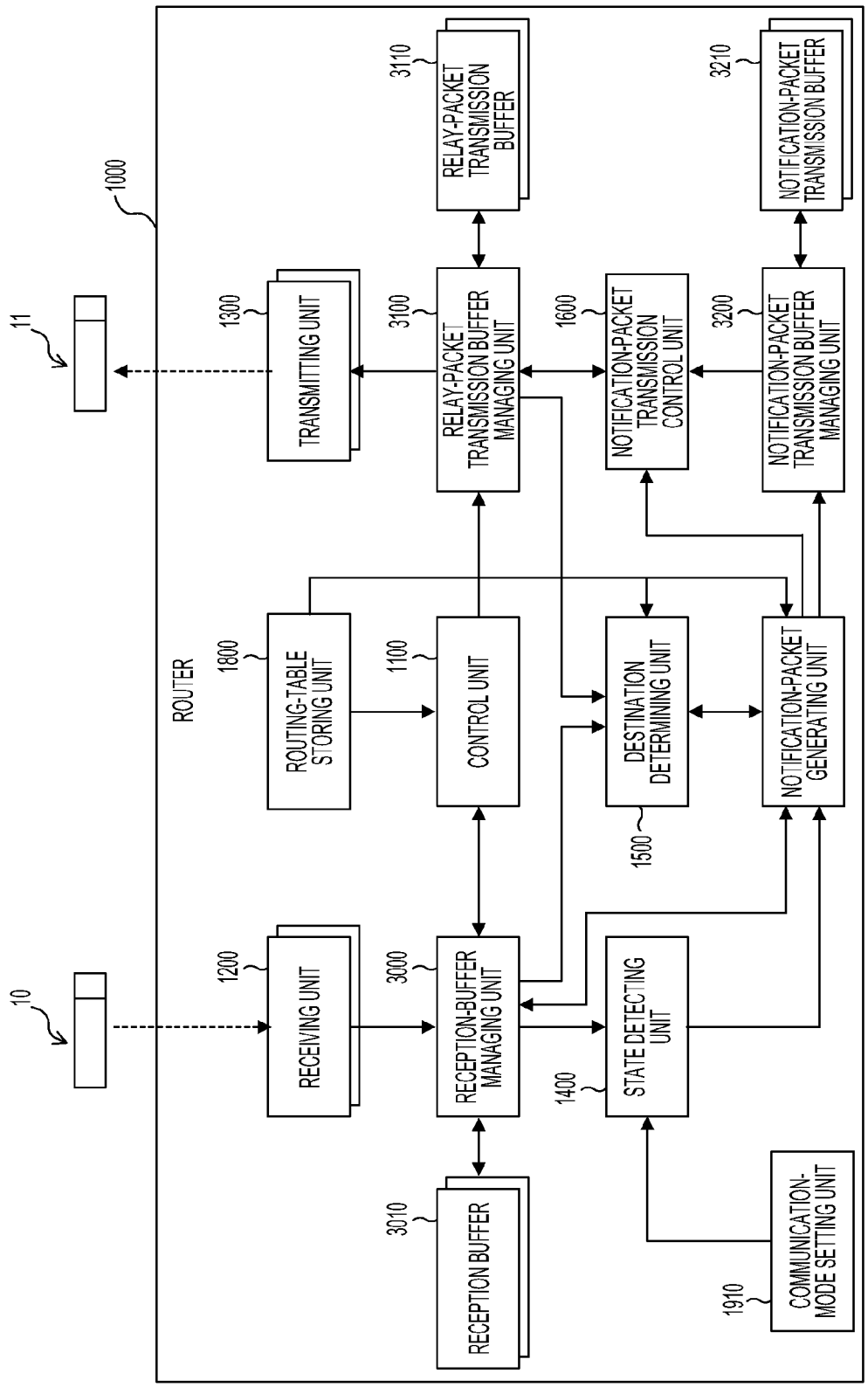
FIG. 18 illustrates an example of a functional configuration of a router (fourth embodiment)

FIG. 18 illustrates an example of a functional configuration of the router 1000 in the fourth embodiment.

The router in the third embodiment described with reference to FIG. 16 notifies the state detecting unit 1400 when the late-collision detecting unit 1900 detects the occurrence of a late collision.

In the fourth embodiment, when changing the setting for the communication mode of the port, a communication-mode setting unit 1910 notifies the state detecting unit 1400 of the change.

Accordingly, the router described in the fourth embodiment has substantially the same functions as in the router 1000 described in the third embodiment, except that the communication-mode setting unit 1910 exists and a notification packet indicating the occurrence of a change in the setting for the communication mode of the port is transmitted.

The description focusing on differences from the router 1000 in the third embodiment among the functions of the router 1000 in the fourth embodiment is provided below.

The communication-mode setting unit 1910 sets the communication mode for the port. The communication mode may be manually set by a user or set by the router 1000. In the case where the communication mode is set by the router 1000, the setting for the communication mode may be said to be set to "automatic."

When setting a different mode from the last set communication mode, the communication-mode setting unit 1910 notifies the state detecting unit 1400 of the change and the identifier of the port. The communication-mode setting unit 1910 stores the communication mode set in each port.

When receiving the notification indicating the change in the communication mode and the identifier of the port from the communication-mode setting unit 1910, the state detecting unit 1400 in the fourth embodiment determines that a notification packet is to be transmitted and requests the notification-packet generating unit 1700 to generate the notification packet.

The destination determining unit 1500 in the fourth embodiment determines the IP address of the destination of the notification packet generated by the router 1000, as in the case of the destination determining unit 1500 in the third embodiment. This destination IP address is acquired from the relay-packet transmission buffer managing unit 3100.

In response to an inquiry from the destination determining unit 1500, the relay-packet transmission buffer managing unit 3100 in the fourth embodiment returns the IP address of the transmission destination of a relay packet to be forwarded next. In the case where a notification packet is transmitted to adjacent devices, a broadcast address is sent back.

A notification packet in the fourth embodiment has substantially the same configuration as that in the third embodiment (see FIG. 17).

The occurrence port 1720 indicates the identifier of the transmission port in which the setting for the communication mode is changed.

The setting information 1721 indicates the communication mode set in the port represented by the occurrence port 1720, i.e., full-duplex communication or half-duplex communication.

In the fourth embodiment, code indicating that "change in communication mode" is set in the state 1714.

Fifth Embodiment

In the third embodiment, the case where a late collision occurs as an example of a fault occurring in a router being a relay device is described.

In the fifth embodiment, a case where a router detects a fault on a network, not a fault occurring in the router, is described. As an example of the case where a router detects a fault on a network, a case where an internet control message protocol (ICMP) message indicting non-delivery of a relay packet forwarded by a router (hereinafter referred to as "non-delivery ICMP packet") is received is described as an example.

A non-delivery ICMP packet contains information concerning a cause of non-delivery of a relay packet. Examples of the cause include non-delivery to a destination network and non-delivery to a destination host.

When receiving a non-delivery ICMP packet, the router in the fifth embodiment transmits a notification packet that contains the details of a fault provided by the non-delivery ICMP packet to adjacent apparatuses. The adjacent apparatuses may identify a nonexistent end terminal and an unopened port in advance, so measures, such as suppressing forwarding a packet to that nonexistent end terminal or the like, may be taken. That is, passing packets that will be undelivered on a network may be reduced, so an increase in unnecessary traffic may be suppressed.

The router in the fifth embodiment may reliably notify adjacent apparatuses of the details of which the router wants to notify them by providing notification about only an item selected as being necessary to be found by the adjacent apparatuses from among received non-delivery ICMP packets by use of a notification packet.

Transmitting a notification packet to the transmission source or transmission destination of an undelivered relay packet enables, for example, a probe device on the route to reliably identify the cause of the non-delivery. The probe device may provide an instruction to the transmission source if necessary.

Functions of the router 1000 in the fifth embodiment are described with reference to FIG. 19.

Figure 19:
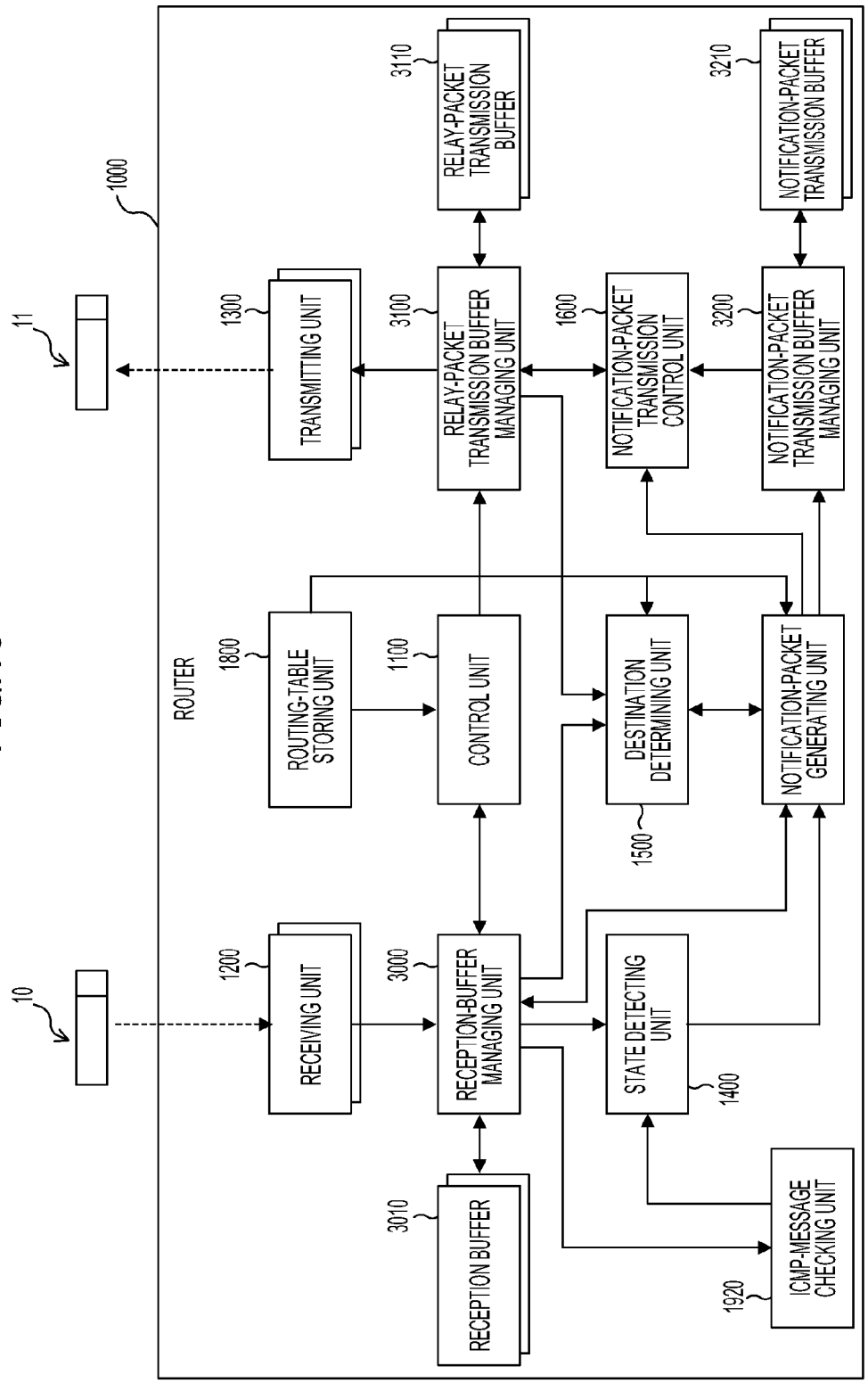
FIG. 19 illustrates an example of a functional configuration of a router (fifth embodiment)

FIG. 19 illustrates an example of a functional configuration of the router 1000 in the fifth embodiment.

The router in the third embodiment described with reference to FIG. 16 notifies the state detecting unit 1400 when the late-collision detecting unit 1900 detects the occurrence of a late collision.

In the fifth embodiment, when detecting receipt of a non-delivery ICMP packet, an ICMP-message checking unit 1920 notifies the state detecting unit 1400 of the receipt.

Accordingly, the router described in the fifth embodiment has substantially the same functions as in the router 1000 described in the third embodiment, except that the ICMP-message checking unit 1920 exists and a notification packet indicating receipt of a non-delivery ICMP packet is transmitted.

The description focusing on differences from the router 1000 in the third embodiment among the functions of the router 1000 in the fifth embodiment is provided below.

The reception-buffer managing unit 3000 in the fifth embodiment stores a received packet in the reception buffer 3010, and if the received packet is an ICMP packet, the reception-buffer managing unit 3000 passes the ICMP packet to the ICMP-message checking unit 1920.

After receiving the ICMP packet from the reception-buffer managing unit 3000, the ICMP-message checking unit 1920 checks whether the message type of the received ICMP packet is a non-delivery ICMP packet type and the received ICMP packet is provided for a relay packet forwarded by the router 1000 itself. The ICMP-message checking unit 1920 refers to the type of the message in the ICMP packet to check whether it is a non-delivery ICMP packet.

The ICMP-message checking unit 1920 refers to information set in an Ethernet frame (Ethernet is a registered trademark) of an ICMP packet and information set in the payload portion of the ICMP packet to check whether the received ICMP packet is provided for a relay packet forwarded by the router 1000 itself. Specifically, it is checked whether the destination MAC address in an Ethernet frame (Ethernet is a registered trademark) of an ICMP packet is the same as the MAC address of a port that forwarded the relay packet in a MAC learning table. Additionally, it is checked whether the IP address of the transmission destination in IP header information of the undelivered relay packet set in the payload portion of the ICMP packet is the same as the subnet portion of the IP address of the router 1000 itself. When the MAC addresses are the same and the IP address is the same as the subnet portion, it is determined that the received ICMP packet corresponds to a relay packet forwarded by the router 1000 itself. If a relay device has no IP address, such as a switch, the determination is made by only agreement between the MAC addresses.

When the received ICMP packet is a non-delivery ICMP packet and it is provided for a relay packet forwarded by the router 1000 itself, the ICMP-message checking unit 1920 notifies the state detecting unit 1400 of the non-delivery ICMP packet.

When receiving the non-delivery ICMP packet from the ICMP message checking unit 1920, the state detecting unit 1400 in the fifth embodiment determines that a notification packet is to be transmitted and requests the notification-packet generating unit 1700 to generate the notification packet.

The notification-packet generating unit 1700 in the fifth embodiment refers to the IP header of the payload portion of the non-delivery ICMP packet, i.e., the IP header of the undelivered relay packet and sets the destination of the notification packet. For example, the IP address of the transmission source of the undelivered relay packet may be set. If the notification packet is transmitted to adjacent devices, a broadcast address is set.

The notification-packet generating unit 1700 refers to the routing table 1810 (see FIG. 5), determines the identifier of the port through which the undelivered relay packet is transmitted, and sets it in the notification packet.

Figure 20:
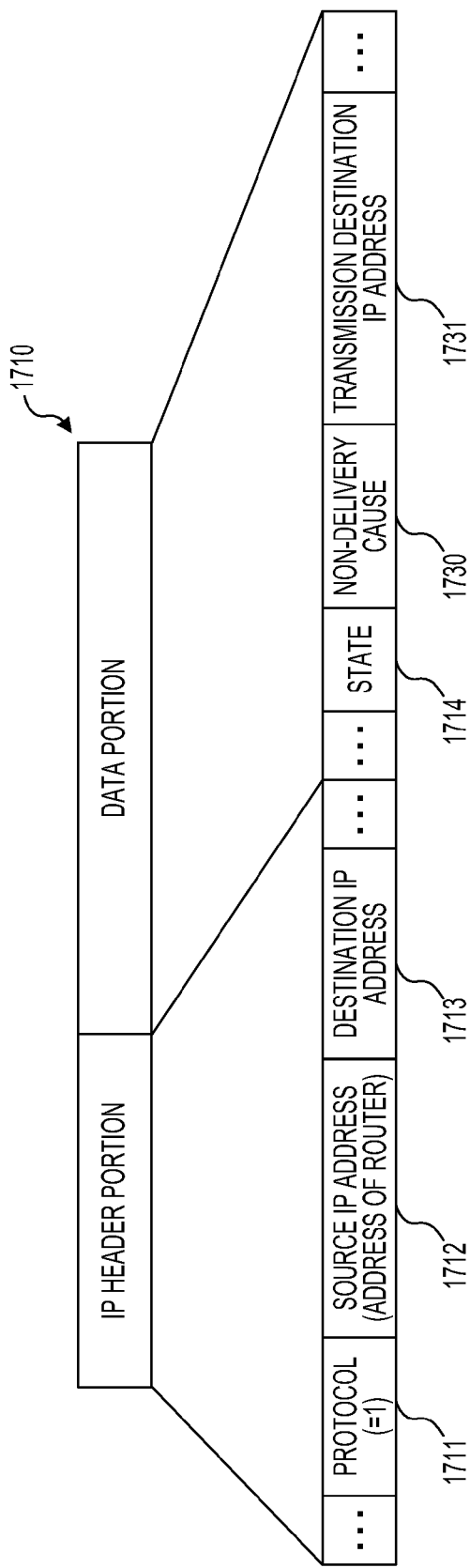
FIG. 20 illustrates an example of a configuration and content of a notification packet (fifth embodiment).

FIG. 20 illustrates an example of a configuration and content of a notification packet in the fifth embodiment.

In the notification packet in the present embodiment, the cause 1715 of the data portion of the notification packet 1710 described in FIG. 4B is replaced with a non-delivery cause 1730 and a transmission destination IP address 1731.

The non-delivery cause 1730 indicates the cause of non-delivery. This is set by referring to a code field in a non-delivery ICMP packet. The code field stores information the details of the non-delivery.

The transmission destination IP address 1731 indicates information about the transmission destination of an undelivered relay packet (e.g., the transmission IP address or port number).

In the fifth embodiment, code indicating "receipt of non-delivery ICMP packet" is set in the state 1714.

<Supplements>

The embodiments of the present invention are described above. However, the present invention is not limited to the above-described embodiments and may be configured as follows:

(1) In at least one of the embodiments, a buffer overflow as an example of a defect is described. However, other faults may also be supported. Alternatively, a notification packet may be transmitted when the state of a router is changed, not when a fault occurs. For example, a notification packet may be transmitted when a change occurs in an internal table. That is, when a change resulting from a fault or a common change occurs in a router and the router is in a specified state, a notification packet is transmitted in accordance with the specified state.

For example, when a buffer overflow occurs, a notification packet is transmitted to the device of the transmission destination or the transmission source of the overflowing relay packet or the causal terminal device from which the buffer overflow results. Alternatively, a notification packet may also be transmitted in a broadcast manner. Also when the remaining free space of the buffer is lower than a specific quantity and when a common change occurs, a notification packet may be transmitted in the above-described way.

(2) In at least one of the embodiments, the case where a fault occurs in a router is described. Alternatively, a relay device other than a router, such as a switch, may also be supported.

(3) In at least one of the embodiments, a notification packet uses an ICMP packet. However, the notification packet is not limited to such an ICMP packet. It may have a format of another protocol as long as it is forwarded on a network. Examples include a user datagram protocol (UDP) packet and a transmission control protocol (TCP) packet.

(4) All or part of the components of the router 1000 illustrated in FIG. 2 and other drawings may be achieved by an integrated circuit of one chip or multiple chips.

(5) All or part of the components of the router 1000 illustrated in FIG. 2 and other drawings may be achieved by a program of a computer or any other form.

In the case of a computer program, the program may be executed after being read by the computer from any recording medium, such as a memory card or a compact-disk read-only memory (CD-ROM) that records the program. The program may also be executed after being downloaded over a network.

(6) The processes described in the first to fifth embodiments may be used in any combination. For example, a router may transmit a notification packet when a transmission buffer overflows or when a reception buffer overflows.

A relay device having the above configuration transmits a packet that contains information for identifying the relay device itself and information indicating that it is in a specified state when detecting that it has been in the specified state. Therefore, a device that receives that packet may identify the position where the specified state occurs and its cause.

Accordingly, the device receiving that packet may take measures against the specified state promptly and accurately in accordance with the position and cause.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A relay device that forwards a packet received from a first device to a second device, the relay device comprising:
a processor to execute a process including:
detecting that the relay device has been in a specified state;
generating a packet that contains information for identifying the relay device and information indicating that the relay device is in the specified state when the detecting detects that the relay device has been in the specified state; and
transmitting the generated packet to a specific transmission destination,
wherein the transmitting transmits the generated packet to the specific transmission destination in accordance with a frequency of detection that the relay device has been in the specified state by the detecting.

2. The relay device according to claim 1, wherein the specified state is a state in which one or more received packets are unable to be forwarded.

3. The relay device according to claim 1, further comprising:
a memory that stores a packet to be forwarded,
wherein the specified state is a state in which a quantity of free space in the memory is lower than a specific quantity.

4. The relay device according to claim 1, wherein the specified state is a state in which an occurrence of a late collision is detected.

5. The relay device according to claim 1, wherein the specified state is a state in which a setting for communication mode of a port is changed.

6. The relay device according to claim 1, wherein the specified state is a state in which a packet that contains information indicating non-delivery of a packet forwarded by the relay device.

7. The relay device according to claim 1, wherein the specified state is a state in which a possible change occurs in the relay device.

8. The relay device according to claim 1, wherein the specific transmission destination is a transmission destination of a packet that was unable to be forwarded.

9. The relay device according to claim 1, wherein the specific transmission destination is a transmission source of a packet that was unable to be forwarded.

10. The relay device according to claim 3, wherein the specific transmission destination is a transmission destination of a packet that has recently been stored in the memory.

11. The relay device according to claim 3, wherein the specific transmission destination is a transmission source of a packet that has recently been stored in the memory.

12. The relay device according to claim 1, further comprising:
a memory that storages a packet to be forwarded,
wherein the specific transmission destination is a transmission source of a received packet, and the transmission source transmitted the largest number of packets stored in the memory.

13. The relay device according to claim 3, wherein the specific quantity is a quantity indicating a number of packets lower than a maximum number of packets that are able to be stored.

14. The relay device according to claim 1, wherein the specific transmission destination is an apparatus belonging to a network to which the relay device belongs.

15. A state notifying method performed by a relay device that forwards a packet received from a first device to a second device, the method comprising:

detecting that the relay device has been in a specified state;
generating a packet that contains information for identifying the relay device and information indicating that the relay device is in the specified state when it is detected in the detecting that the relay device has been in the specified state; and
transmitting the generated packet to a specific transmission destination,
wherein the transmitting transmits the generated packet to the specific transmission destination in accordance with a frequency of detection that the relay device has been in the specified state by the detecting.

16. A computer-readable storage medium encoded with a computer program to make a relay device that forwards a packet received from a first device to a second device notify a state of the relay device, the program when executed by a computer causes the computer to perform a method comprising:

detecting that the relay device has been in a specified state;
generating a packet that contains information for identifying the relay device and information indicating that the relay device is in the specified state when it is detected that the relay device has been in the specified state; and
transmitting the generated packet to a specific transmission destination,
wherein the transmitting transmits the generated packet to the specific transmission destination in accordance with a frequency of detection that the relay device has been in the specified state by the detecting.

* * * * *